United States Patent
Gagliardi et al.

(10) Patent No.: US 9,604,701 B2
(45) Date of Patent: Mar. 28, 2017

(54) MARINE SEISMIC SURVEYING IN ICY OR OBSTRUCTED WATERS

(71) Applicant: ION Geophysical Corporation, Houston, TX (US)

(72) Inventors: Joseph R. Gagliardi, Katy, TX (US); Shawn Rice, Spring, TX (US); Curt Schneider, Houston, TX (US); Jeffrey W. Cunkelman, Sugar Land, TX (US); Timothy A. Dudley, Houston, TX (US); Dale Lambert, Mandeville, LA (US); Mike Burnham, Houston, TX (US)

(73) Assignee: ION Geophysical Corporation, Houston, TX (US)

( * ) Notice: Subject to any disclaimer, the term of this patent is extended or adjusted under 35 U.S.C. 154(b) by 574 days.

(21) Appl. No.: 14/054,116

(22) Filed: Oct. 15, 2013

(65) Prior Publication Data
US 2014/0102347 A1   Apr. 17, 2014

Related U.S. Application Data

(62) Division of application No. 12/719,783, filed on Mar. 8, 2010, now Pat. No. 8,593,905.
(Continued)

(51) Int. Cl.
*G01V 1/38*      (2006.01)
*B63B 3/38*      (2006.01)
(Continued)

(52) U.S. Cl.
CPC ............... *B63B 3/38* (2013.01); *B63B 3/14* (2013.01); *B63B 21/66* (2013.01); *B63B 21/663* (2013.01);
(Continued)

(58) Field of Classification Search
CPC ....... B63B 2211/06; B63B 21/66; G01V 1/38; G01V 1/3843
(Continued)

(56) References Cited

U.S. PATENT DOCUMENTS

| | | | |
|---|---|---|---|
| 644,943 | A | 3/1900 | Pino |
| 694,153 | A | 2/1902 | Holland |

(Continued)

FOREIGN PATENT DOCUMENTS

| | | |
|---|---|---|
| EP | 0154968 | 9/1985 |
| FR | 2496277 | 6/1982 |

(Continued)

OTHER PUBLICATIONS

A Geometric Approach to Strapdown Magnetometer Calibration in Sensor Frame, J.F. Vasconcelos, et al., 11 pages, undated.
(Continued)

*Primary Examiner* — Ian J Lobo
(74) *Attorney, Agent, or Firm* — Blank Rome LLP

(57) ABSTRACT

A marine seismic surveying apparatus for obstructed waters includes a deployed device and a buoy. The deployed device is disposed at an end of a streamer and is towed below a surface of water. The buoy extends from the end of the streamer to the water's surface. A coupling connects the buoy to the end of the streamer and is breakable due to tension from the buoy obstructed at the surface of the water. A receiver associated with the buoy obtains location information via the buoy at the water's surface. The deployed device can reckon its location with an inertial navigation system in place of location information obtained with the buoy's receiver. Also, the buoy can be deployed at the surface of the water, and more than one buoy can be available for deployment should one be lost.

22 Claims, 27 Drawing Sheets

Related U.S. Application Data

(60) Provisional application No. 61/246,367, filed on Sep. 28, 2009, provisional application No. 61/261,329, filed on Nov. 14, 2009, provisional application No. 61/158,698, filed on Mar. 9, 2009.

(51) Int. Cl.
  *B63B 21/66* (2006.01)
  *B63B 35/08* (2006.01)
  *B63B 3/14* (2006.01)
  *B63B 3/70* (2006.01)
  *B63B 43/18* (2006.01)

(52) U.S. Cl.
  CPC ............... *B63B 35/08* (2013.01); *G01V 1/38* (2013.01); *G01V 1/3843* (2013.01); *B63B 3/70* (2013.01); *B63B 43/18* (2013.01); *B63B 2211/06* (2013.01)

(58) Field of Classification Search
  USPC ...................................... 367/15–18
  See application file for complete search history.

(56) References Cited

U.S. PATENT DOCUMENTS

| | | |
|---|---|---|
| 1,487,138 A | 3/1924 | Atwood |
| 1,625,245 A | 4/1927 | Herbert |
| 1,690,578 A | 11/1928 | Hammond, Jr. |
| 2,030,768 A | 2/1936 | Shultz |
| 2,462,568 A | 2/1949 | Steckel |
| 2,556,423 A | 6/1951 | Gross |
| 2,566,029 A | 8/1951 | Louthan |
| 2,572,255 A | 10/1951 | Lee |
| 2,692,570 A | 10/1954 | Costa |
| 2,765,565 A | 10/1956 | Mussio |
| 3,034,471 A | 5/1962 | Aschinger |
| 3,159,806 A | 12/1964 | Piasecki |
| 3,172,510 A | 3/1965 | Lee et al. |
| 3,331,050 A | 7/1967 | Kilmer |
| 3,336,572 A | 8/1967 | Paull et al. |
| 3,354,658 A | 11/1967 | Leonardi |
| 3,437,987 A | 4/1969 | Burg |
| 3,497,869 A | 2/1970 | Silverman |
| 3,583,445 A | 6/1971 | Harbonn et al. |
| 3,605,668 A | 9/1971 | Morgan |
| 3,621,380 A | 11/1971 | Barlow, Jr. |
| 3,635,186 A | 1/1972 | German |
| 3,703,876 A | 11/1972 | Michelsen |
| 3,739,736 A | 6/1973 | Carreau et al. |
| 3,744,014 A | 7/1973 | Greenlaw |
| 3,810,081 A | 5/1974 | Rininger |
| 3,886,882 A | 6/1975 | Thornburg et al. |
| 3,935,829 A | 2/1976 | Lantz |
| 4,004,265 A | 1/1977 | Woodruff et al. |
| 4,027,616 A | 6/1977 | Guenther |
| 4,031,630 A | 6/1977 | Fowler |
| 4,033,277 A | 7/1977 | Schaper |
| 4,033,278 A | 7/1977 | Waters |
| 4,037,189 A | 7/1977 | Bell et al. |
| 4,047,579 A | 9/1977 | Wilckens et al. |
| 4,124,990 A | 11/1978 | Bell et al. |
| 4,139,074 A | 2/1979 | White |
| 4,189,703 A | 2/1980 | Bennett |
| 4,196,688 A | 4/1980 | Lipinsky |
| 4,231,111 A | 10/1980 | Neeley |
| 4,276,845 A | 7/1981 | Spanner |
| 4,290,123 A | 9/1981 | Pickens |
| 4,313,181 A | 1/1982 | Holm |
| 4,313,392 A | 2/1982 | Guenther et al. |
| 4,314,363 A | 2/1982 | Thigpen et al. |
| 4,354,446 A | 10/1982 | Goldsmith |
| 4,372,420 A | 2/1983 | White |
| 4,404,664 A | 9/1983 | Zachariadis |
| 4,520,468 A | 5/1985 | Scherbatskoy |
| 4,547,869 A * | 10/1985 | Savit .............. G01H 9/004 367/130 |
| 4,552,086 A | 11/1985 | Boe |
| 4,566,083 A | 1/1986 | Thigpen |
| 4,570,245 A | 2/1986 | Thigpen |
| 4,581,723 A | 4/1986 | Savit |
| 4,616,348 A | 10/1986 | Ostrander |
| 4,616,590 A | 10/1986 | Albertini et al. |
| 4,621,347 A | 11/1986 | Ostrander |
| 4,648,083 A | 3/1987 | Giallorenzi |
| 4,719,987 A | 1/1988 | George, Jr. et al. |
| 4,729,333 A | 3/1988 | Kirby et al. |
| 4,756,268 A | 7/1988 | Gjestrum et al. |
| 4,775,028 A | 10/1988 | de Heering |
| 4,798,156 A | 1/1989 | Langeland et al. |
| 4,800,831 A | 1/1989 | Hellmann et al. |
| 4,870,626 A | 9/1989 | Tveit |
| 4,890,568 A * | 1/1990 | Dolengowski .......... B63B 21/66 114/163 |
| 4,992,991 A | 2/1991 | Young et al. |
| 4,998,227 A | 3/1991 | Rygg et al. |
| 5,046,055 A | 9/1991 | Ruffa |
| 5,097,788 A | 3/1992 | Castel |
| 5,113,376 A * | 5/1992 | Bjerkoy .............. G01V 1/3808 367/15 |
| 5,142,505 A | 8/1992 | Peynaud |
| 5,144,588 A | 9/1992 | Johnston et al. |
| 5,157,636 A * | 10/1992 | Bjerkoy .................. B63G 8/42 114/244 |
| 5,263,431 A | 11/1993 | Wood |
| 5,305,703 A | 4/1994 | Korsgaard |
| 5,353,223 A | 10/1994 | Norton et al. |
| 5,408,441 A | 4/1995 | Barr et al. |
| 5,532,975 A | 7/1996 | Elholm |
| 5,546,882 A * | 8/1996 | Kuche .................. G01V 1/3826 114/244 |
| 5,666,900 A | 9/1997 | Carroll |
| 5,676,083 A | 10/1997 | Korsgaard |
| 5,841,733 A | 11/1998 | Bouyoucos et al. |
| 5,941,746 A | 8/1999 | Isnard et al. |
| 6,002,648 A | 12/1999 | Ambs |
| 6,012,406 A | 1/2000 | Dudley et al. |
| 6,021,577 A | 2/2000 | Shiells et al. |
| 6,046,959 A | 4/2000 | Salmi et al. |
| 6,058,072 A | 5/2000 | Abraham |
| 6,088,296 A | 7/2000 | Seaman et al. |
| 6,189,477 B1 | 2/2001 | Cody |
| 6,212,476 B1 | 4/2001 | Noy et al. |
| 6,227,310 B1 | 5/2001 | Jamieson |
| 6,230,840 B1 | 5/2001 | Ambs |
| 6,467,423 B1 | 10/2002 | Poldervaart |
| 6,474,254 B1 | 11/2002 | Ambs et al. |
| 6,487,782 B1 | 12/2002 | Bond |
| 6,493,636 B1 | 12/2002 | DeKok |
| 6,504,792 B2 | 1/2003 | Barker |
| 6,525,992 B1 | 2/2003 | Olivier et al. |
| 6,532,189 B2 | 3/2003 | Barker |
| 6,606,958 B1 | 8/2003 | Bouyoucos |
| 6,683,819 B1 | 1/2004 | Estaphan et al. |
| 6,823,262 B2 | 11/2004 | Bahorich et al. |
| 6,877,237 B1 | 4/2005 | Withanawasam |
| 7,042,803 B2 | 5/2006 | Kutty et al. |
| 7,092,315 B2 | 8/2006 | Olivier |
| 7,184,366 B1 * | 2/2007 | Harrick .............. G01V 1/3808 367/20 |
| 7,190,634 B2 | 3/2007 | Lambert et al. |
| 7,203,130 B1 | 4/2007 | Welker |
| 7,206,254 B2 | 4/2007 | Oliver et al. |
| 7,206,256 B1 | 4/2007 | Thornton et al. |
| 7,209,408 B1 | 4/2007 | Stottlemyer et al. |
| 7,221,623 B2 | 5/2007 | Thornton et al. |
| 7,222,579 B2 | 5/2007 | Hillesund et al. |
| 7,252,046 B1 | 8/2007 | Ead et al. |
| 7,293,520 B2 | 11/2007 | Hillesund et al. |
| 7,376,515 B2 | 5/2008 | Smith |
| 7,423,929 B1 | 9/2008 | Olivier |
| 7,457,193 B2 | 11/2008 | Pramik |
| 7,623,411 B2 | 11/2009 | Faucheaux et al. |
| 7,660,189 B2 | 2/2010 | Vigen et al. |

(56) References Cited

U.S. PATENT DOCUMENTS

| | | | |
|---|---|---|---|
| 8,347,801 | B2 | 1/2013 | Denise |
| 8,570,829 | B2 | 10/2013 | Hovland |
| 8,817,574 | B2 | 8/2014 | Elvestad |
| 2005/0180263 | A1 | 8/2005 | Lambert et al. |
| 2006/0176775 | A1 | 8/2006 | Toennessen |
| 2006/0215489 | A1* | 9/2006 | Solheim ............... G01S 15/87 367/20 |
| 2006/0239122 | A1 | 10/2006 | Vigen et al. |
| 2006/0254490 | A1 | 11/2006 | Ryan et al. |
| 2006/0256653 | A1 | 11/2006 | Toennessen et al. |
| 2006/0262647 | A1 | 11/2006 | Thornton et al. |
| 2007/0070808 | A1 | 3/2007 | Ray et al. |
| 2007/0115757 | A1 | 5/2007 | Soerli et al. |
| 2008/0019214 | A1 | 1/2008 | Pramik |
| 2008/0025146 | A1 | 1/2008 | Welker |
| 2008/0141916 | A1 | 6/2008 | Bein |
| 2008/0163504 | A1 | 7/2008 | Smith et al. |
| 2008/0192570 | A1 | 8/2008 | Tenghamn et al. |
| 2008/0223583 | A1 | 9/2008 | Roveri et al. |
| 2008/0285381 | A1 | 11/2008 | Moldoveanu et al. |
| 2009/0141587 | A1 | 6/2009 | Welker et al. |
| 2009/0141591 | A1 | 6/2009 | Basilico |
| 2009/0147619 | A1* | 6/2009 | Welker ............... F03B 13/00 367/15 |
| 2009/0161485 | A1 | 6/2009 | Toennessen et al. |
| 2009/0262601 | A1 | 10/2009 | Hillesund et al. |
| 2009/0265111 | A1 | 10/2009 | Helwig et al. |
| 2009/0296519 | A1 | 12/2009 | Keers et al. |
| 2009/0316526 | A1 | 12/2009 | Grall |
| 2010/0226204 | A1 | 9/2010 | Gagliardi et al. |
| 2010/0312519 | A1 | 12/2010 | Huang et al. |
| 2011/0013481 | A1 | 1/2011 | Clark |
| 2013/0182531 | A1 | 7/2013 | Gagliardi |

FOREIGN PATENT DOCUMENTS

| | | |
|---|---|---|
| GB | 1376513 | 12/1974 |
| GB | 1415706 | 11/1975 |
| GB | 2142432 A | 1/1985 |
| GB | 2436256 A | 9/2007 |
| RU | 13929 U1 | 6/2000 |
| RU | 652250 U1 | 7/2007 |
| RU | 2317572 C1 | 2/2008 |
| SU | 1382736 A | 3/1988 |
| SU | 1520459 A1 | 11/1989 |
| SU | 1744660 | 6/1992 |
| SU | 1744660 A1 | 6/1992 |
| SU | 1835938 A1 | 4/1995 |
| WO | 2005/096018 A1 | 10/2005 |
| WO | 2008/008127 A2 | 1/2008 |
| WO | WO 2008060719 | 5/2008 |
| WO | 2008/113914 A2 | 9/2008 |
| WO | WO 2008140654 | 11/2008 |
| WO | WO 2009045639 | 4/2009 |

OTHER PUBLICATIONS

A Non-Linear, Two-Step Estimation Algorithm for Calibrating Solid-State Strapdown Magnetometers, by Gebre-Egziabher, D. et al. Department of Aeronautics and Astronautics, Stanford University, 10 pages, undated.

A simple method of magnetic declination fluctuation correction for long single-streamer positioning in a seismic survey, by Victor Martin, et al., Geophysical Prospecting, 2004, 52, 351-358; Received Apr. 2003, revision accepted Oct. 2003; (c) 2004 European Association of Geoscientists & Engineers, 8 pages.

Calibration of Strapdown Magnetometers in Magnetic Field Domain, Demoz Gebre-Egziabher, et al., Journal of Aerospace Engineering (c) ASCE Apr. 2006; obtained from www.ascelibrary.org, downloaded Jun. 1, 2011, 16 pages.

Chapter III: Theory of Magnetic Compass Adjustment, 7 pages, undated.

Pending Claims in counterpart Russian Appl. No. 2011140864.

Danish Examination Report from counterpart DK Appl. No. PA201070472, dated Sep. 22, 2011.

European Search Report from Counterpart EP Appl. No. 12168832.9, dated Oct. 11, 2013.

European Search Report from Counterpart EP Appl. No. 12168832.9, dated May 3, 2013.

First Office Action in counterpart Canadian Appl. 2,754,543, mailed Aug. 1, 2013.

Fugro News, "Fugro Announces Purchase of FOCUS-2 ROTV Systems," dated Nov. 16, 2005, obtained from http://www.fugro.com, generated on Nov. 21, 2009.

HNB Ice Period Buoy Manufacturer Exporting Direct from Hebei China, obtained from http://buoy.en.alibaba.com, generated on Sep. 25, 2009.

Honeywell, "3-Axis Digital Compass IC HMC5843," obtained from www.honeywell.com/magneticsensors, Form #900367, Jun. 2010, 20 pages.

Honeywell, "Three-Axis Strapdown Magnetometer—HMR2300r," obtained from http://www.ssec.honeywell.com, 900232 Rev. B 1/99, 8 pages.

Ice Spar Buoy, Rotonics Mfg. Inc., http://www.rotonics.com, 2807 Stephen F. Austin Drive, Brownwood, TX 76801, dated Jun. 3, 2003.

"Impacts of Marine Acoustic Technology on the Antarctic Environment,"" version 1.2, dated Jul. 2002, SCAR Ad Hoc Group on Marine Acoustic Technology and the Environment, 62 pgs."

Koo, W. et al., "In-flight Heading Estimation of Strapdown Magnetometers using Particle Filters," obtained from IEEE (c) 2008, 6 pages.

Intelligent Acquisition—"Streamer Steering Case Study," obtained from http://www.iongeo.com, generated on Nov. 10, 2009.

International Search Report and Written Opinion in PCT/US2010/026617, dated May 4,2010.

International Search Report from counterpart PCT Appl. No. PCT/US2012/036739, dated May 3, 2013.

ION Geophysical, "DigiFIN:Streamer Steering ," obtained from http://www.iongeo.com, generated on Nov. 10, 2009.

ION Marine Imaging Systems—Optimizing 4D Repeatability with Enhanced Acquisition Technologies, by Mike Burnham, 4pgs., (c) 2007.

ION Marine Imaging Systems, DigiFIN, Performance Data (c) 2008.

ION Marine Imaging Systems, "Model 5010 DigiBIRD, Performance Data," (c) 2007.

ION Marine Imaging Systems, "Model 5011 Compass Bird, Performance Data," (c) 2007.

Jokat, W. et al. "Marine Seismic Profiling in Ice Covered Regions," Polarforschung 64 (1): 9-17, 1994.

MacArtney A/S—Worldwide Underwater Technology, "ROTV Remote Towed Vehicles," obtained from http://www.macartney.com, generated on Nov. 12, 2009.

Marine Magnetometer: Woods Hold Oceanographic Institution, obtained from http://www.whoi.edu/page.do? bid=8415&tid=282&cid=14847&print=this, generated on Mar. 23, 2011, 3 pages.

MEMSense: Technical Document, Compensating for Tilt, Hard Iron and Soft Iron Effects, Published Aug. 6, 2008, Updated Dec. 4, 2008, by Christopher Konvalin, Revision 1.2, obtained from www.memsense.com, Document No. MTD-0802, 15 pages.

Microstrain, Inc. "Microminiature Sensors 3DM-GX1 Hard Iron Calibration," Published Sep. 19, 2005, obtained from www.microstrain.com, 13 pages.

New Method for Magnetometers Based Orientation Estimation, Valerie Renaudin, et al. Schulich School of Engineering Position Location and Navigation (PLAN) Group, University of Calgary; IEEE/ION Plans 2010, May 4-6, 2010, Palm Springs, CA, 9 pages.

Official Action in counterpart Danish Appl. No. PA201270271, dated Dec. 18, 2012.

Official Action in counterpart Russian Appl. No. 2011140864, dated Apr. 29. 2012.

ORCA—Instrument Room Control System, obtained from http://www.iongeo.com, generated on Nov. 10, 2009.

(56) References Cited

OTHER PUBLICATIONS

PESA News, "Extending the Range and Geographical Applicability of the Q-Marine Solution," by Tim Bunting, Western Geo, dated Apr./May 2009, 2 pages.
Konig, M., "Processing of shipborne magnetometer data and revision of the timing and geometry of the Mesozoic break-up of Gondwana," Alfred Wegener Institute, Institute for Polar and Marine Research, 145 pages, undated, 3btained Jun. 1, 2011.
Second Office Action in counterpart Chinese Appl. 201080017371.0, mailed Sep. 22, 2013.
Slocum Glider: Design and 1991 Field Trials, prepared by Paul Simonetti, Webb Research Corp., under subcontract from Woods Hole Oceanographic Institiution, Office of Naval Technology, Contract No. N00014-90C-0098, dated Sep. 1992.
Terra Antarctica, "A Novel Over-Sea-Ice Seismic Reflection Survey in McMurdo Sound, Antarctica," by S. J. Betterly, Montana Tech of the University of Montana, dated Sep. 18, 2007.
The US/UK World Magnetic Model for 2010-2015, Maus, et al., NOAA Technical Report NESDIS/NGDC, dated 2010, obtained Jun. 1, 2011, 104 pages.
Verboom, N. et al., "Towed body magnetometer enhances subsea surveys," undated, obtained from www.chelsea.co.uk on Jun. 1, 2011, 2 pages.
J F Vasconcelos et al.: "Geometric Approach to Strapdown Magnetometer Calibration in Sensor Frame", IEEE Transactions on Aerospace and Electronic Systems, Jan. 1, 2011 (Jan. 1, 2011), pp. 1293-1306.
Triaxus Towed Undulator, MacArtney Underwater Technology Group, dated Oct. 1, 2005.

TwoStep: A Fast Robust Algorithm for Attitue-Independent Magnetometer-Bias Determination, by Roberto Alonso and Malcolm D. Shuster, The Journal of the Astronautical Sciences, vol. 50, No. 4, Oct.-Dec. 2002, pp. 433-451.
Konvalin, Compensating for tilt, Hard Iron and Soft Iron effect, Sensors Dec. 1, 2009, http://www.sensormag.com/sensors/motion-velocity-dicplacement/compensating-tilt-hard-iron-and-soft-iron-effects-6475.
First Examination Report in counterpart DK Appl. PA 2012 70134, dated Apr. 9, 2015, 7-pgs.
Second Examination Report in counterpart DK Appl. PA 2012 70134, dated Mar. 9, 2016, 2-pgs.
First Examination Report in counterpart DK Appl. PA 2012 70135, dated May 24, 2016, 6-pgs.
First Examination Report in counterpart DK Appl. PA 2012 70136, dated May 24, 2016, 6-pgs.
First Examination Report in counterpart DK Appl. PA 2012 70137, dated May 25, 2016, 7-pgs.
Non-Final Rejection in co-pending U.S. Appl. No. 14/054,098, mailed Dec. 24, 2015; 12-pgs.
Reply to Non-Final Rejection in co-pending U.S. Appl. No. 14/054,098, mailed Dec. 24, 2015; 16-pgs.
Third Examination Report in counterpart DK Appl. PA 2012 70134, dated Dec. 13, 2016, 5-pgs.
Second Examination Report in counterpart DK Appl. PA 2012 70135, dated Jan. 5, 2017, 4-pgs.
Second Examination Report in counterpart DK Appl. PA 2012 70136, dated Jan. 5, 2017, 3-pgs.
Second Examination Report in counterpart DK Appl. PA 2012 70137, dated Jan. 5, 2017, 3-pgs.

\* cited by examiner

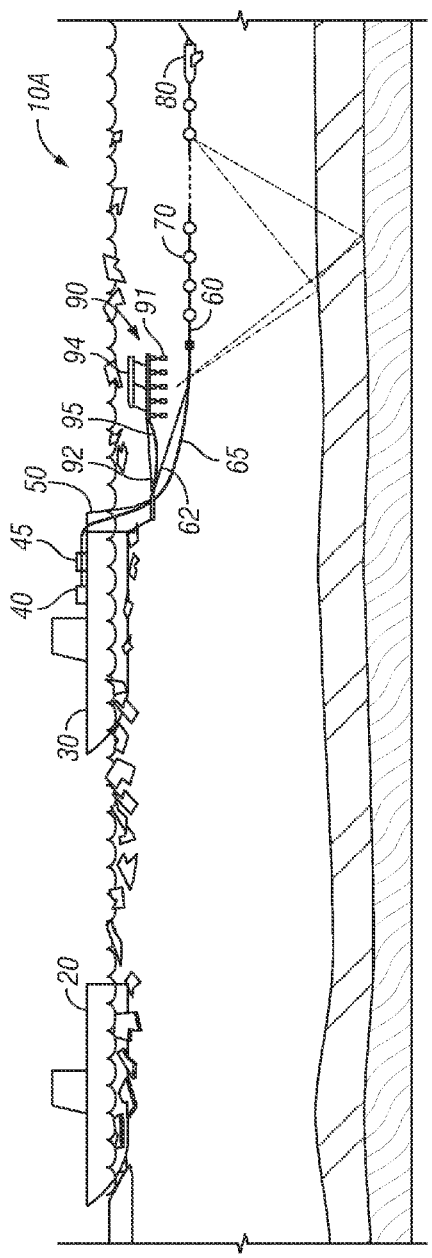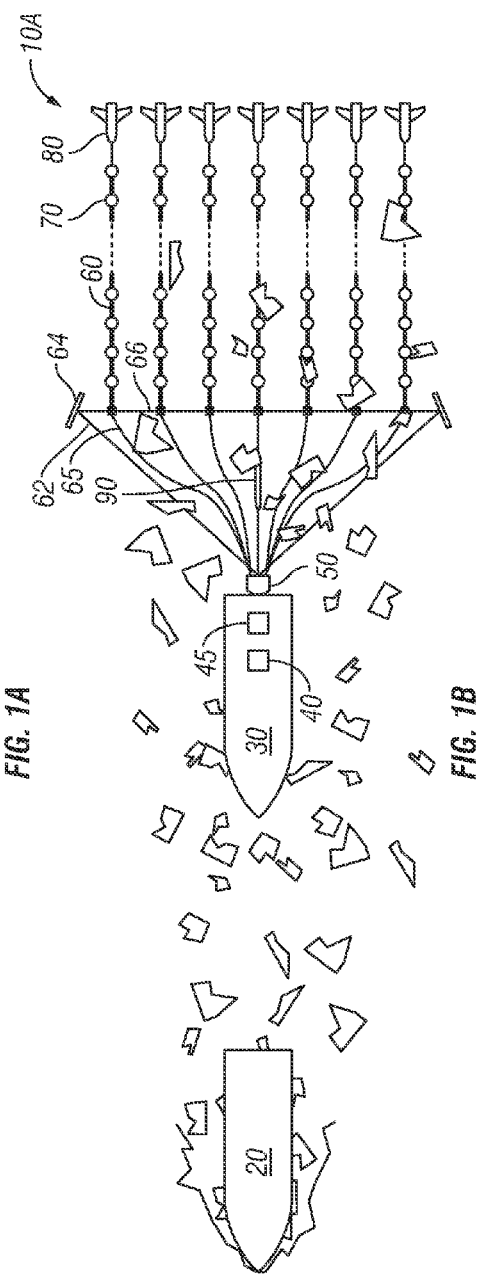
FIG. 1A
FIG. 1B

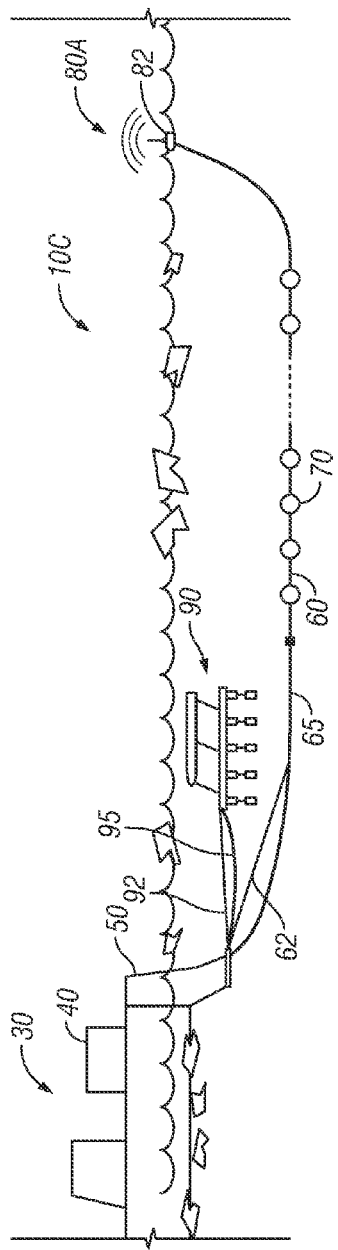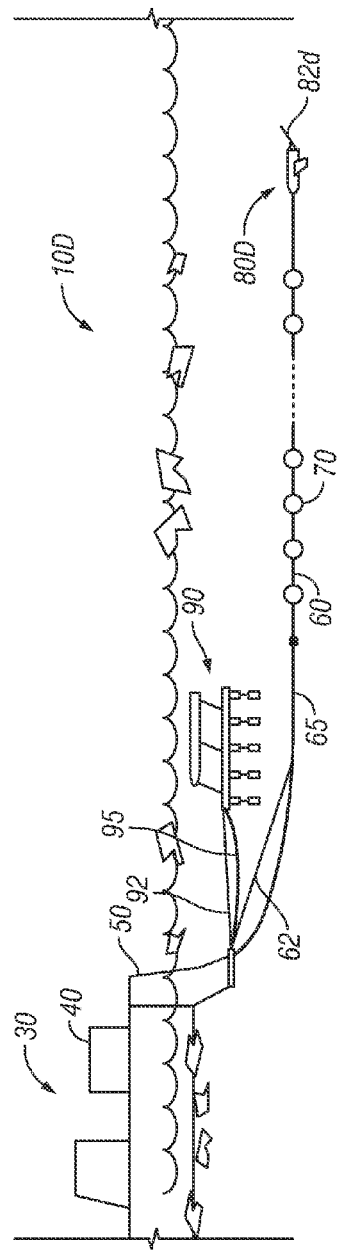

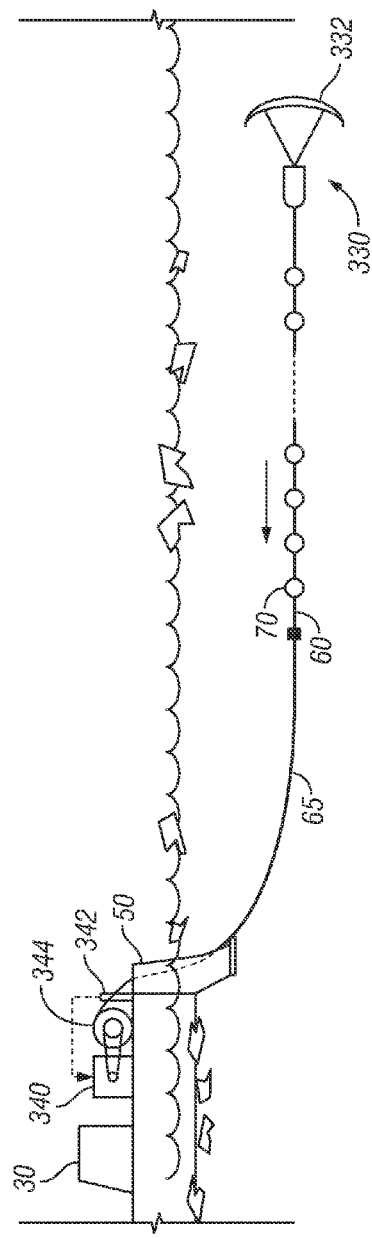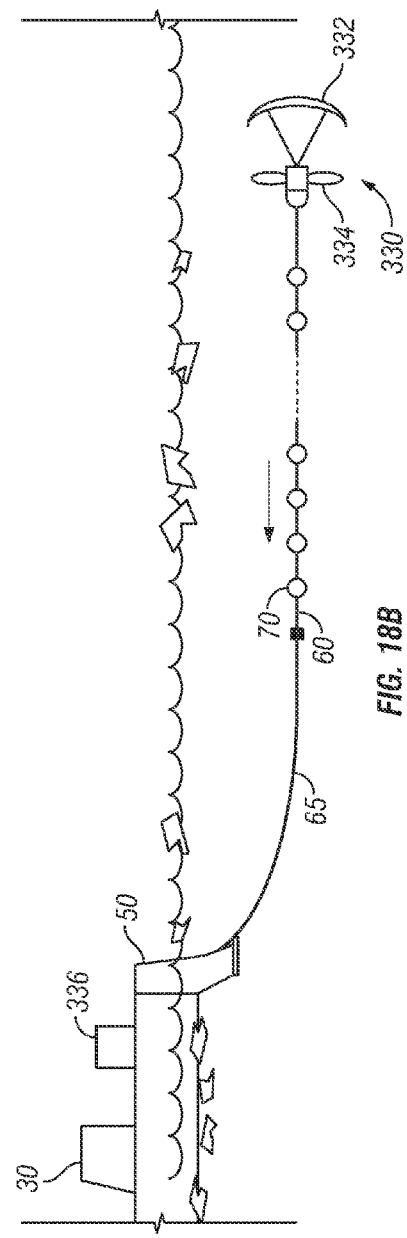
FIG. 18A
FIG. 18B

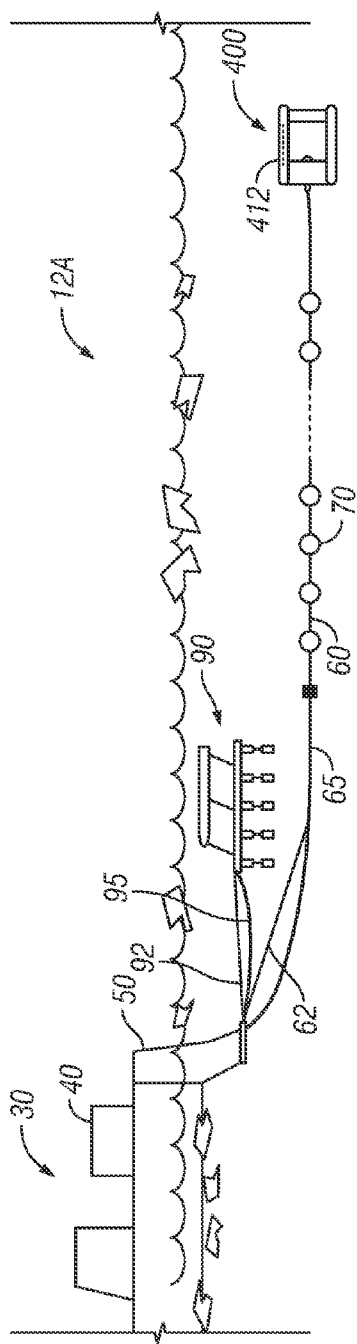
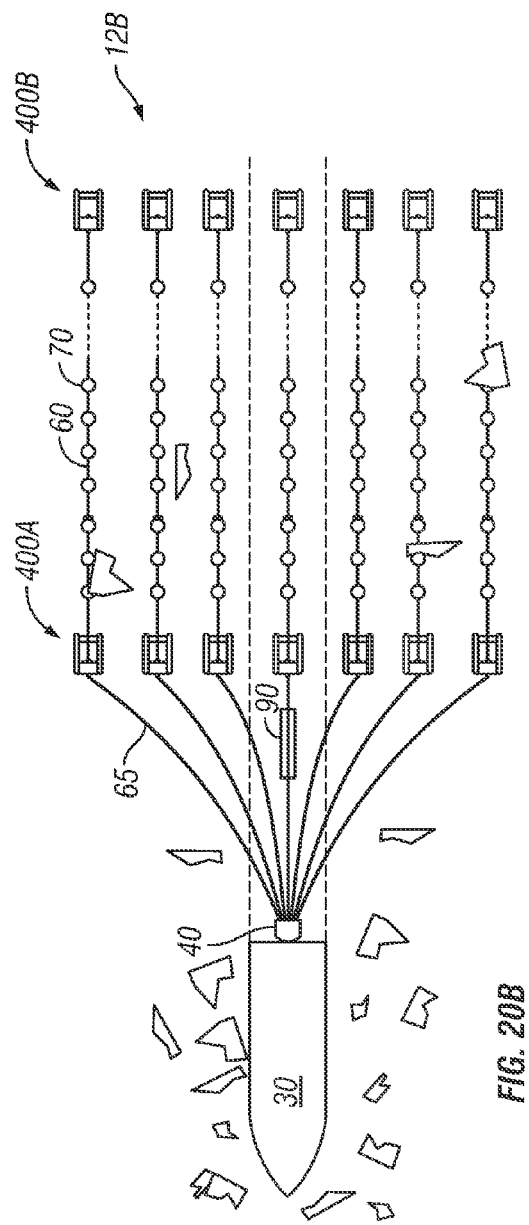
FIG. 20A
FIG. 20B

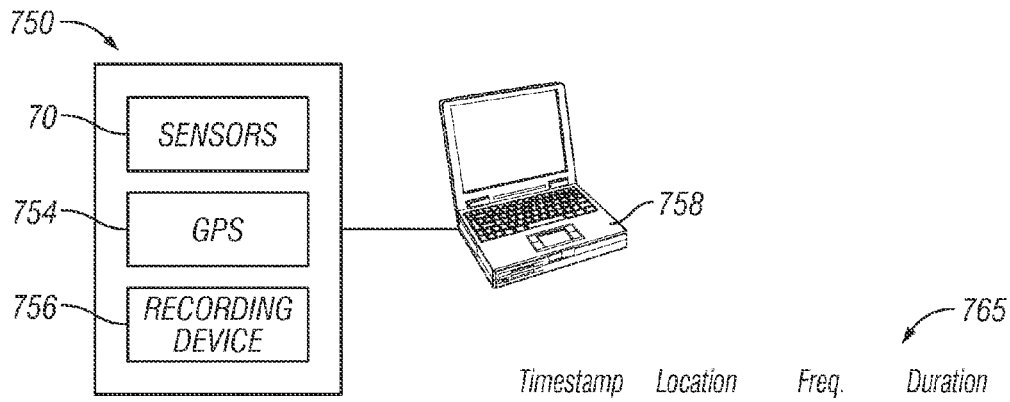
FIG. 29
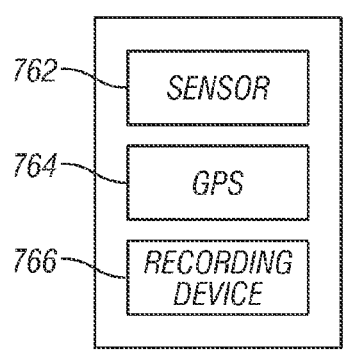
FIG. 30
FIG. 31
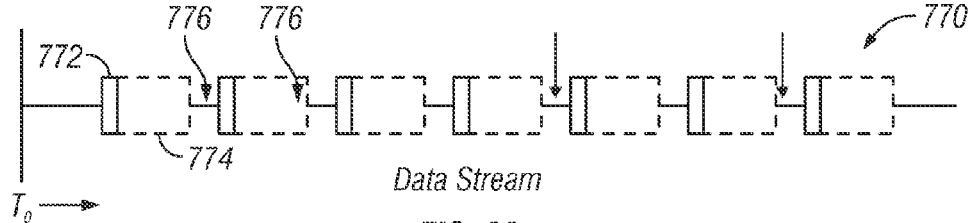
Data Stream
FIG. 32
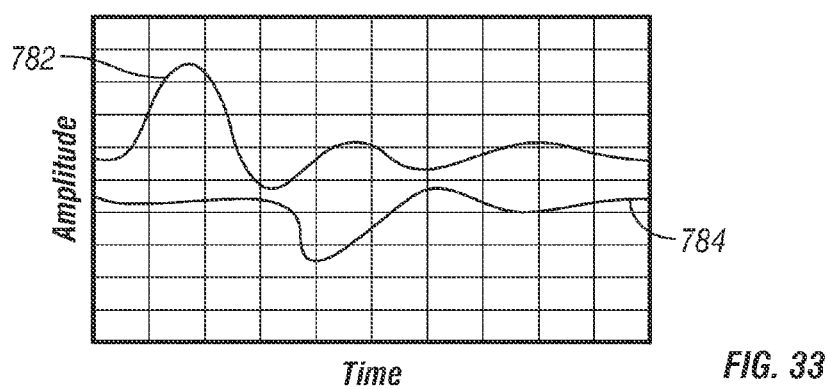
FIG. 33

MARINE SEISMIC SURVEYING IN ICY OR OBSTRUCTED WATERS

CROSS-REFERENCE TO RELATED APPLICATIONS

This is a divisional application of U.S. application Ser. No. 12/719,783, filed 8 Mar. 2010, which is a non-provisional of U.S. Prov. Appl. Nos. 61/158,698, filed 9 Mar. 2009 and entitled "Marine Seismic Surveying in Icy Waters; 61/246,367, filed 28 Sep. 2009 and entitled "Floatation Device for Marine Seismic Surveying in Icy Waters;" and 61/261,329, filed 14 Nov. 2009 and entitled "Marine Seismic Surveying in Icy or Obstructed Waters," which are each incorporated herein by reference in their entireties and to which priority is claimed.

BACKGROUND

Conventional marine seismic surveying uses a seismic source and a number of streamers towed behind a seismic survey vessel. These streamers have sensors that detect seismic energy for imaging the formations under the seafloor. Deploying the streamers and sources and towing them during a survey can be relatively straightforward when operating in open waters with moderate swells or the like.

Marine locations covered by ice, debris, large swells, or other obstacles can make surveying more difficult, expensive, or even impossible. In icy waters, for example, the seismic survey vessel must break through ice and traverse waters filled with ice floes. The noise generated by ice impacts can complicate the seismic record produced.

Additionally, the ice floes on the water's surface make towing the source and streamers more difficult and prone to damage. For example, any components of the system at the water's surface can encounter ice, become bogged down, and lost. In addition, any cables or towlines coming off the vessel even from slipways can collect ice at the surface. Likewise, ice pulled under the hull and rising behind the vessel can shear away these cables and lines.

Some approaches for performing seismic surveys in icy regions known in the art are disclosed in U.S. Pat. Nos. 5,113,376 and 5,157,636 to Bjerkoy. To date, however, the problems associated with marine seismic surveying in icy or obstructed waters have not been significantly addressed. The subject matter of the present disclosure is directed to overcoming, or at least reducing the effects of, one or more of the problems set forth above.

SUMMARY

A marine seismic surveying apparatus has a skeg that mounts on a vessel and preferably on the vessel's aft or stern. The skeg's distal end extends below the vessel's waterline and can even extend several meters below the vessel's keel. A seismic surveying system deploys from the vessel and has a number of cables for streamers and cables for a seismic source, such as an air gun array. To protect these cables, a channel in the skeg's after edge holds the cables and directs them below the vessel's waterline. In this way, surface ice cannot interfere with the cables while the seismic surveying system is being towed.

The skeg's distal end has tow points, which can be provided on a base. Towlines for the system's streamers and source connect to these tow points. In this way, these towlines deploy under the water and away from any ice floes that may be present at the water's surface.

In the towed survey system behind the vessel, a floatation device can support a horizontally arrayed source. Preferably, this device floats below the water's surface to avoid ice floes. Alternatively, a vertical source can be used from the skeg. When operating this vertical source, the firing of the source elements or guns can be timed to account for any tilt that the vertical source has. This timed firing can maintain the fidelity of the sources and keep a downward facing characteristic of the seismic source signal produced.

Because the streamers are towed below the water's surface, the streamers can have deployed devices, including fins, wings, paravanes, glider buoys, Remotely Operated Vehicles (ROVs), Remotely Operated Towed Vehicles (ROTVs), and Autonomous Operated Vehicles (AOVS), which can be capable of directional and positioning control. For example, the controllable deployed device can be towed vehicles that can position the streamers individually in lateral or vertical positions under the water's surface. In addition, ends of the streamers can have particular controllable vehicles with Global Positioning System (GPS) receivers.

To facilitate locating the streamers and sensors for the survey, these controllable vehicles can be intermittently brought to the surface when clear of ice floes or other obstructions so that GPS readings can be obtained and communicated to a control system. After obtaining the GPS readings, the controllable vehicles can float back under the surface. An Inertial Navigation System (INS) device, integrated navigation system, or other system can be used to supplement the GPS readings so the location of the streamers can be determined even when significant ice floes at the surface prevent the controllable vehicles from obtaining GPS readings.

When performing the marine seismic surveying, an ice-breaking vessel or the tow vessel itself may break pack ice ahead of the towed streamers and source. In the disclosed system, Ice impact events against the hull of the ice-breaking vessel are detected and recorded while the streamers and source are being towed. At the same time, seismic signals from the source are generated, and the sensors on the streamers detect seismic energy, which is recorded as part of the seismic record for the survey. Using information about the recorded impact events, the data in the seismic record resulting from those events can then be filtered out of the seismic record, allowing operators to analyze the seismic data relatively free of data from the ice impact events. Alternatively, the known information about the impact events can be isolated from the seismic record and can be mathematically modeled as high fidelity sources of seismic data for analysis.

The foregoing summary is not intended to summarize each potential embodiment or every aspect of the present disclosure.

BRIEF DESCRIPTION OF THE DRAWINGS

FIGS. 1A-1B show side and plan views of a marine seismic survey system according to certain teachings of the present disclosure for use in icy regions.

FIGS. 3A-3B are cross-sectional views of the ice skeg.

FIGS. 12A-12D illustrate side views of marine seismic survey systems having a flotation device and controllable devices.

FIGS. 18A-18B show arrangements for handling a submerged streamer if the tow vessel 30 must slow or stop.

FIG. 20A illustrates a side view of a marine seismic survey system having a Remotely Operated Towed Vehicle (ROTV) as the controllable device at the tail end of the streamers.

FIG. 20B illustrates a plan view of another marine seismic survey system having ROTVs at multiple locations on the streamers.

FIG. 29 schematically shows a seismic recorder for a towing vessel.

FIG. 30 schematically shows a recording system for an ice-breaking vessel.

FIG. 31 shows a representative table of data recorded during ice break events.

FIG. 32 diagrammatically shows a data stream recorded by the marine seismic system.

FIG. 33 graphically shows representative amplitude responses of recorded seismic data of the marine seismic system.

DETAILED DESCRIPTION

A. Marine Seismic Survey System

Figure 2A:
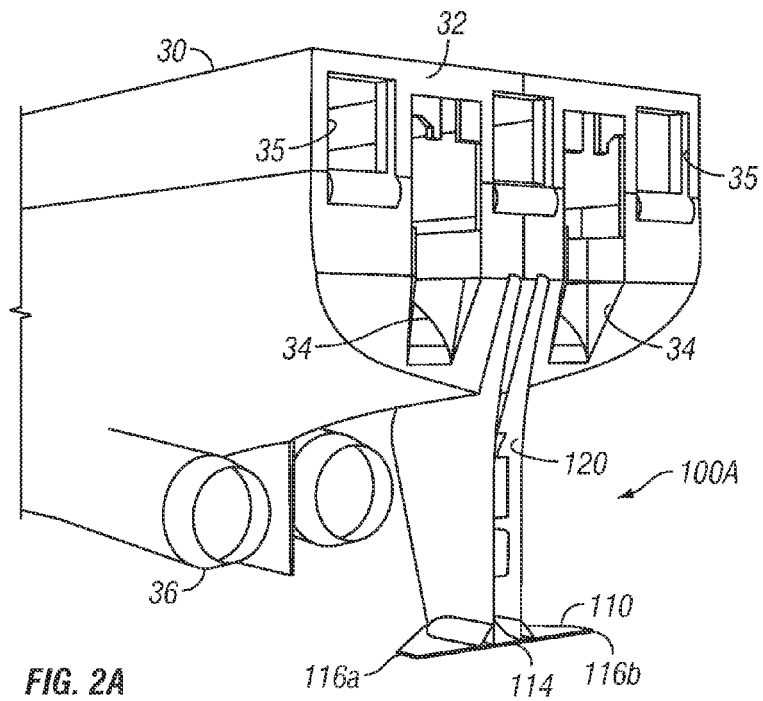
FIGS. 2A-2D show perspective, back, side, and top views of an ice skeg on a vessel for towing an array of seismic streamers and a source.

A marine seismic survey system 10A in FIGS. 1A-1B can be used in icy regions having glacial ice, pack ice, and ice floes. However, elements of the system 10A can be used in other locations having debris, plants, flotsam, jetsam, or other obstructions or obstacles at the water's surface that can interfere with towed components of the marine seismic survey system.

For icy regions, the system 10A preferably includes an icebreaker vessel 20 that breaks ice in advance of a tow vessel 30. In operation, the icebreaker vessel 20 breaks pack ice and diverts ice floes to create a tract for passage of the tow vessel 30. As the tow vessel 30 tows one or more streamers 60, a supply system 45 operates a source 90, and a control system 40 having a seismic recorder records the seismic data obtained with sensors 70 on the streamers 60.

Because the tow vessel 30 operates in icy or obstructed waters, a protective device 50 on the tow vessel 30 couples to towlines 65 that support the streamers 60. (Although multiple streamers 60 are shown, the system 10A can have one steamer 60 if desired). As discussed below, the protective device 50 (referred to herein as an ice skeg) keeps towlines and cables for the towed components away from ice floes on the water's surface. In this way, the ice skeg 50 allows the vessel 30 to tow the streamers 60 in ice covered waters while handling various loads caused by motions of the vessel 30, forces from the towed bodies, and interactions with the ice.

In general, the ice skeg 50 can be located anywhere on the vessel 30. As best shown in FIG. 1A, however, the ice skeg 50 preferably extends from the vessel's hull at the stern. This abaft position is better suited for deploying cables, towlines, and other components of the marine seismic survey system being towed by the vessel 30. In one arrangement, the ice skeg 50 is a static addition to the vessel 30 that can be welded, incorporated, or otherwise attached in a shipyard to an existing design of a vessel's hull. Alternatively, the vessel 30 can be predesigned and built with an appropriate ice skeg 50 incorporated into its hull design, or the ice skeg 50 may be a deployable component provided with appropriate mechanisms for deploying and holding it on the vessel 30. In yet another arrangement, the skeg 50 can be a portable or independent component that can be mounted temporarily on the side of the vessel without the need for modifying the vessel's hull.

Extending below the vessel's waterline, the ice skeg 50 keeps the attachment points for towlines 62/92 below the surface of the water. This keeps the towlines 62/92 below any ice floes floating on the water's surface that could interfere with or collect around the towlines 62/92. Streamer cables 65 connected to the seismic recorder of the control system 40 extend form the vessel 30, and the skeg 50 directs these streamer cables 65 below the water's surface so that ice will not interfere with or collect around them. The depth required to effectively hold the streamer cable towlines 62 and streamer cables 65 below the ice level can be depend on the particular implementation. As one example, the ice skeg 50 may extend about 7-m below the vessel 30's waterline. However, this distance can vary for a given implementation, depending on the type of ice regime in which the vessel is operating, the size of the vessel, and other factors.

In the present arrangement, a seismic source 90 suspends horizontally in the water column behind the vessel 30 and has a plurality of seismic source elements 91, which are typically air guns. (Although one source 90 is shown, the system 10A can use multiple sources.) A supply cable 95 connected to the supply system 45 extends from the vessel 30, and the ice skeg 50 also directs this supply cable 95 below the water's surface so it is out of the way of ice as well. A towline 92 connects the cable 95 to the ice skeg 50 and helps tow the source 90 behind the vessel 30.

The supply cable 95 is preferably buoyant, and the source 90 can be stabilized by one or more flotation devices or buoys 94. Because ice moves along the surface of the water, the flotation device 94 can be designed to handle interactions with ice as it floats at the surface. Accordingly, the flotation device 94 can be shaped to minimize impacts with ice and can be arranged horizontally to cut through any ice floes at the surface. Preferably, however, the flotation device 94 is designed to avoid contact with ice by floating below the surface, as discussed in more detail later.

To tow the horizontal source 90 behind the vessel 30, the towline 92 secures to the ice skeg's base under the water and connects to the source 90 suspended below the water's surface. One or more support lines interconnect the flotation device 94 with the source 90. The supply cable 95 extends off the end of the vessel 30, fits through a channel in the ice skeg 50, and connects to the source 90 for operation.

In general, the towlines 62/92, streamers 60, sensors 70, cables 65/95, control system 40, and supply system 45 can be conventional components known and used in marine seismic surveying. For example, the source elements 91 can be operated in any conventional manner to create a suitable seismic source signal. In addition, the streamers 60 can use neutrally buoyant cables used for supporting appropriate marine seismic sensors 70. As such, each streamer 60 can have several sections with each having an outer skin to protect the interior from water and having axial members along its length for axial strength. Each section of the streamer 60 can also have a wire bundle that carries electrical power and data communication wires. For the pair, the sensors 70 are typically hydrophones located within the streamer 60.

As further shown in FIG. 1B, paravanes, fins, or doors 64 and a spreader 66 can be used to support multiple streamers 60 behind the tow vessel 30. These paravanes 64 and spreader 66 can also be similar to conventional components used for marine seismic surveying, except that the paravanes 64 preferably tow under the water's surface as discussed later.

With an understanding of the disclosed system, discussion now turns to particular components of the system, starting with the ice skeg.

B. Single Conduit Skeg

Figure 2B:
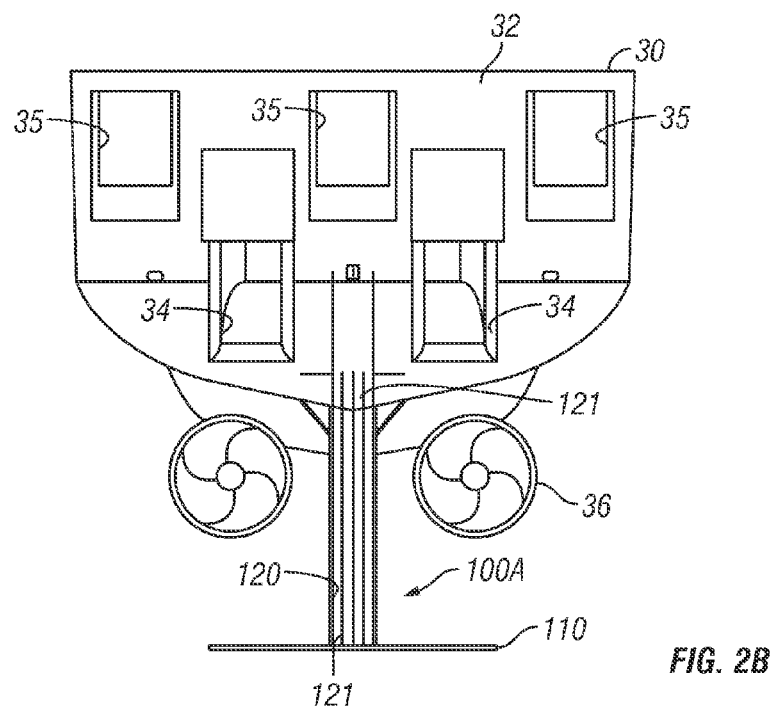

As discussed above, the tow vessel 30 uses the ice skeg 50 to keep the towlines 62/92 and cables 65/95 away from ice floes at the water's surface. As shown in FIGS. 2A-2B, one embodiment of an ice skeg 100A mounts onto the aft 32 of the seismic tow vessel 30 used to tow seismic streamers (not shown). As noted previously, the skeg 100A can mount anywhere on the vessel 30, including the port, starboard, bow, or through a moon pool in the hull. However, the stern or aft 32 of the vessel 30 is preferred because the streamers (not shown) are best towed behind the vessel 30, which can help break ice floes while towing the streamers.

In this embodiment, the ice skeg 100A is a single conduit extending from the aft 32 of the vessel 30. So as not to interfere significantly with the vessel's steering and other functions, this single conduit skeg 100A is preferably used on a vessel 30 having dual screws 36, although it could be used with other types of vessels. The ice skeg 100A extends under the hull between slipways 34 used for deploying and retrieving steamers and cables. Along its after or trailing edge, the skeg 100A defines an open passage or channel 120 for passage of steamer cables, source cables, and slack lines as discussed later.

Even though the skeg 100A extends off the aft 32, ice may be forced to flow along the bottom of the vessel's hull when surveying in icy waters. This forced ice eventually reaches the aft 32 of the vessel 30 where it again resurfaces. In other situations, ice impacted by the bow of the vessel 30 may be forced under the vessel's hull and then attempt to resurface toward its aft 32 as the vessel 30 travels forward. In any event, the skeg 100A acts as a protective conduit to keep the towlines, cables, and the like away from this ice.

At its distal end, the skeg 100A has a base or plate 110 that provides attachment points 114/116a-b for the towlines. In this way, the skeg 100A provides tow points 114/116a-b below the water's surface and away from the ice floes at the surface. In addition to remaining protected from ice floes, these undersurface tow points 114/116a-b also help maintain the streamers and source below the surface.

Figure 2C:
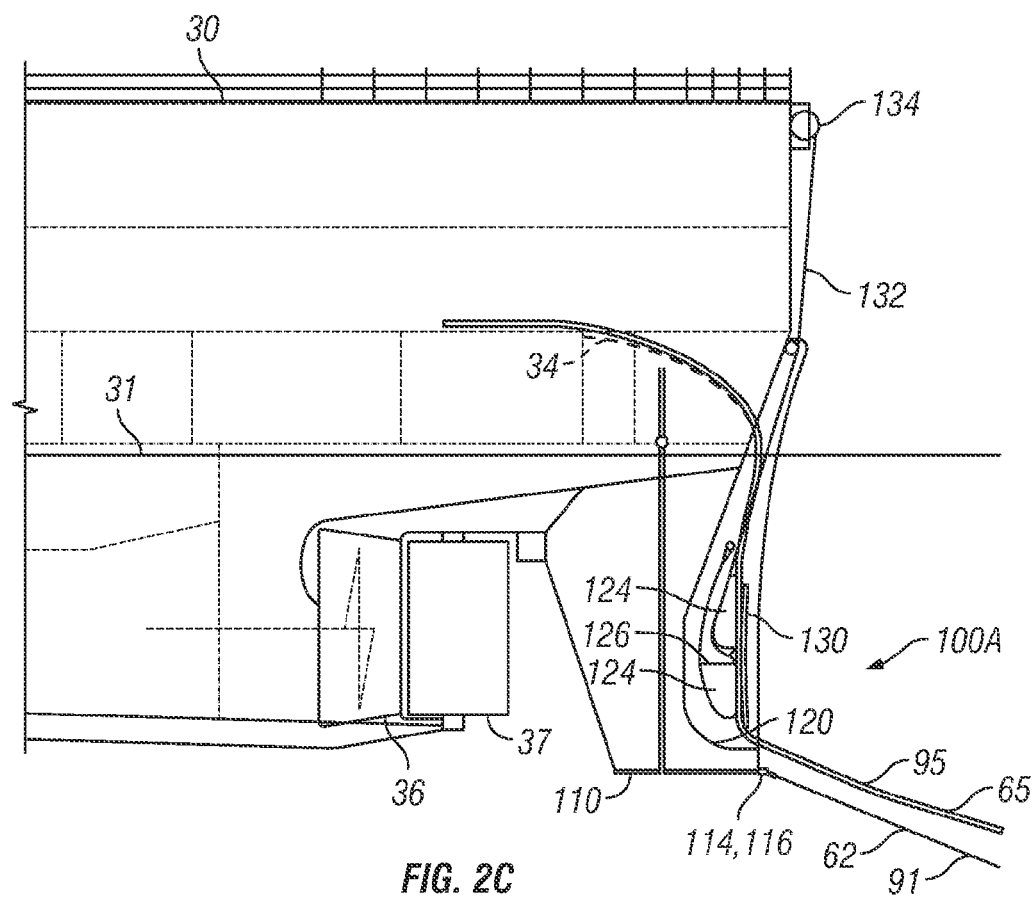
Figure 2D:
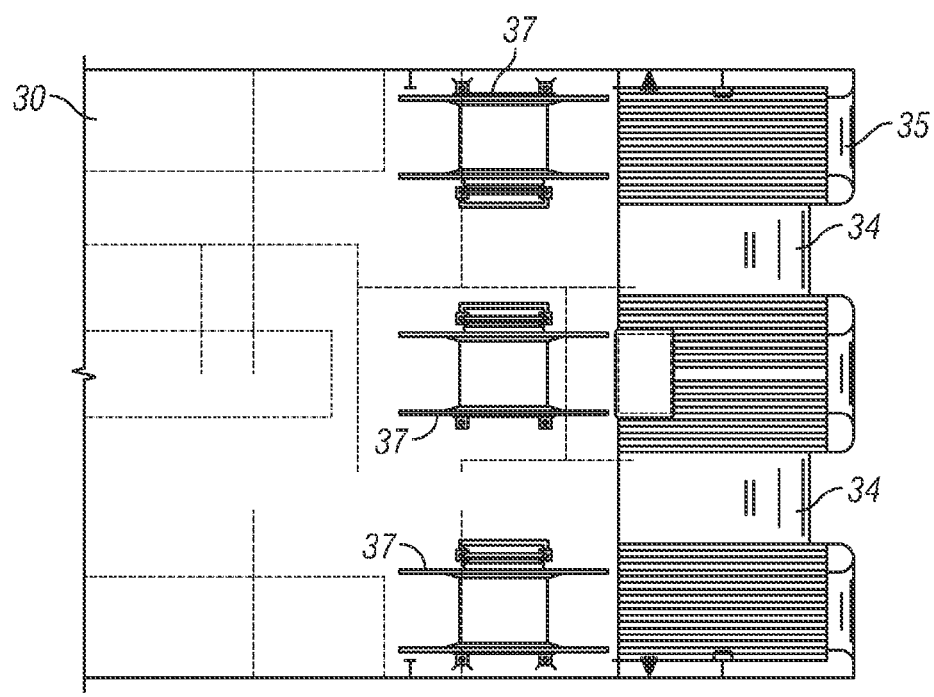

Additional details of the ice skeg 100A are shown in FIGS. 2C-2D illustrating the ice skeg 100A mounted on the vessel 30. As best shown in FIG. 2C, the distal end of the skeg 100A positions to about the depth of the vessel's keel, and the tow points 114/116 are held below the vessel's waterline 31, as mentioned previously.

As also shown in FIG. 2C, streamer cables 65 and supply cables 95 run off the vessel 30 through slipways 34 (See also FIG. 2D). The cables 65/95 pass through the channel 120 in the ice skeg 100A. In turn, the channel 120 directs the cables 65/95 under the vessel's waterline 31 toward the skeg's base 110, where the cables 65/95 can then follow the vessel 30 without interference from ice floes.

One or more line stiffeners or bend limiters 130 hold the cables 65/95 in the skeg's channel 120, and slack lines 132 pass in the channel 120 and attach to these line stiffeners 122. In addition, steel guides 124 in the channel 120 can support the cables 65/95, and a curved passage 126 can be provided for the slack lines 132 so that they can be diverted through the channel 120 separately from the cables 65/95. The slack lines 132 can have about a ⅝-in. (16-mm.) diameter so that three to four slack lines 132 may fit into the guides' passage 126. Each slack line 132 leads to a hydraulic winch 134 used for pulling the line 132 and attached stiffener 122 to which they are coupled.

As shown in the top view of FIG. 2D, the vessel 30 has slipways 34 leading off the vessel's stern for passage of streamer and source cables (not shown). Other slipways 35 are also provided and aligned with winches 37 for holding tow and retrieval lines for the seismic survey system. Thus, the vessel 30 can have these and other conventional features known and used in the art for marine seismic surveying.

Referring to FIGS. 3A-3B, the upper extension 106 and the inside corner 108 of the ice skeg 100A can be designed to suit an existing vessel and its ice horn. As shown in these cross-sections, the ice skeg 100A is internally hollow and has outer shell walls 102 and internal supports 104. In one implementation, for example, the skeg 100A may have an internal volume of approximately 14 cubic meters and may weigh about 27-MT.

The hollow internal volume gives the skeg 100A some buoyancy that can help support the skeg's weight on the vessel 30. To ensure that the skeg 100A remains free of water, the skeg 100A can be fitted with a means of sounding and a means of de-watering as well. For this reason, the skeg 100A can have an internal passage 105 extending from top to bottom and fitted with a pipe 107 and a gate valve 109 at the vessel's deck as shown in FIGS. 3A-3B.

Figure 3C:
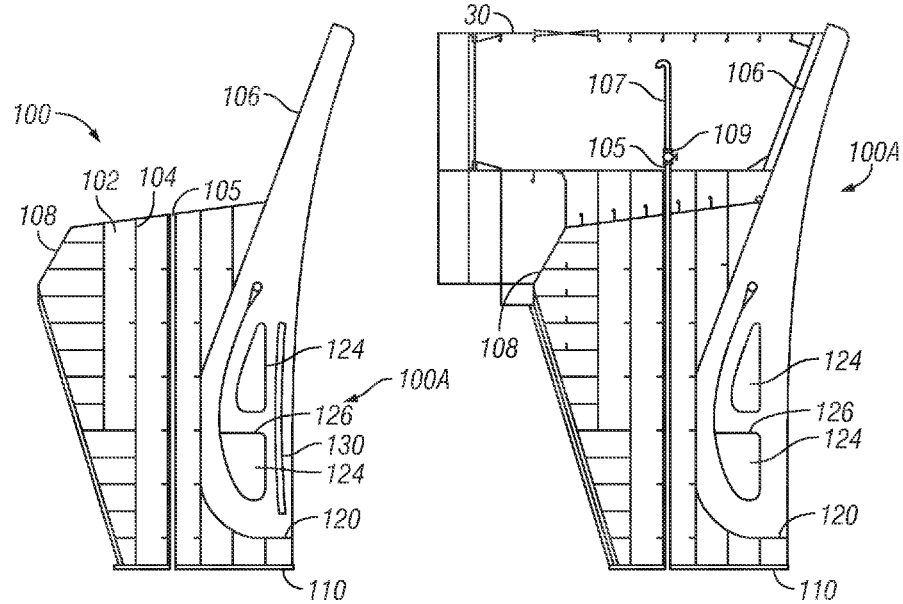
FIG. 3C is a top view of the ice skeg's blade.
Figure 3C:
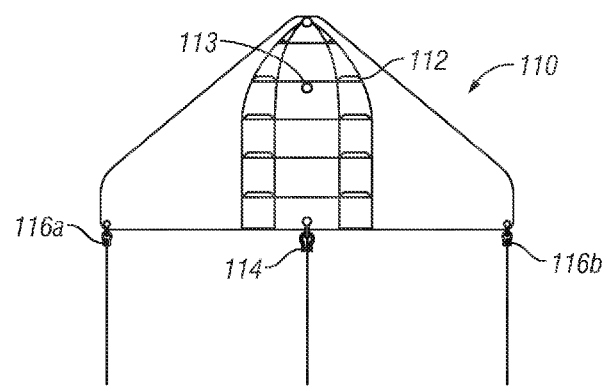

As best shown in FIG. 3C, the ice skeg's base 110 can be a fin or beaver shaped plate, although other shapes could be used. The base 110 can be fixed to the distal end of the skeg 100. Alternatively, the base 110 can be mounted on a swivel or hinges so it can rotate laterally and/or vertically. As shown, the base plate 110 has brackets 112 for attaching to the end of the skeg's body. As also shown, the base 110 has an opening 113 for passage of the pipe (107; FIG. 3B) and has three tow points 114/116a-b.

The outer tow points 116a-b can be used for towlines that support sources (not shown), and the center tow point 114 can be used for a towline that supports the one or more streamers (not shown). In one implementation, the outer tow points 116a-b can be configured for 5-ton loads each, and the center tow point 114 can be configured for an 18-ton load. Other configurations of tow points and different load levels can be provided depending on the implementation. Moreover, the skeg 100A can have tow points 114/116a-b placed elsewhere, and more or less tow points may be provided than shown.

Figure 4A:
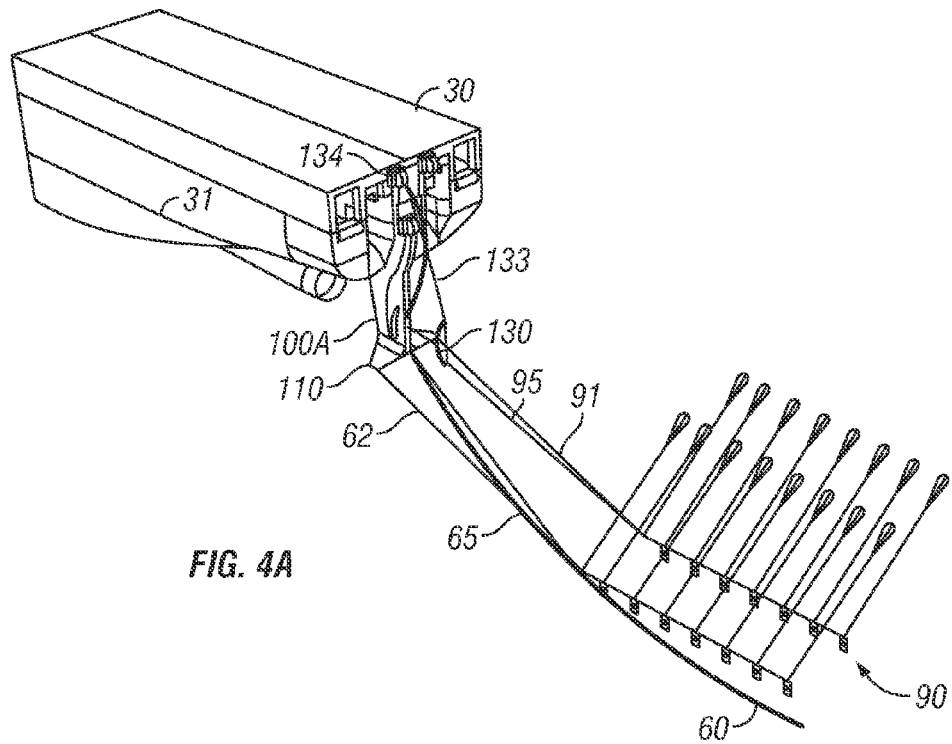
FIGS. 4A-4C show perspective views of deploying cables, towlines, and components of a marine seismic system using the disclosed ice skeg.
Figure 4B:
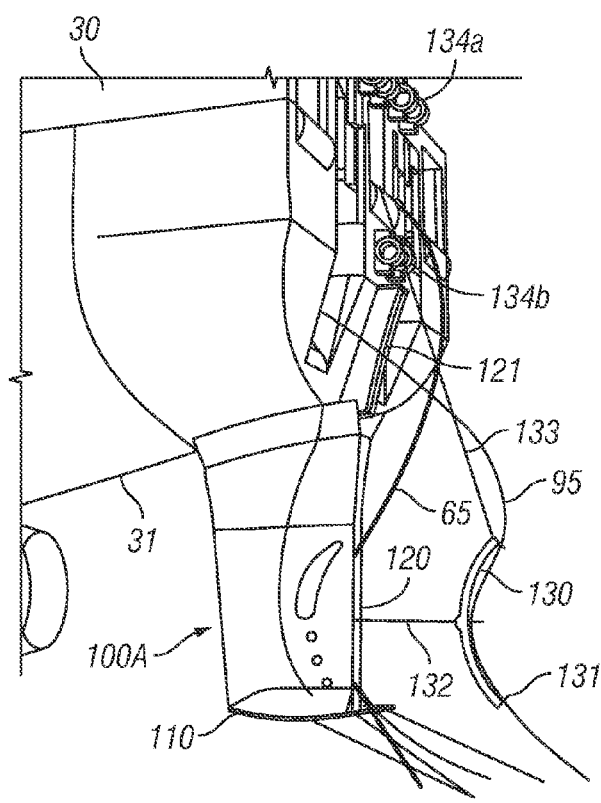
Figure 4C:
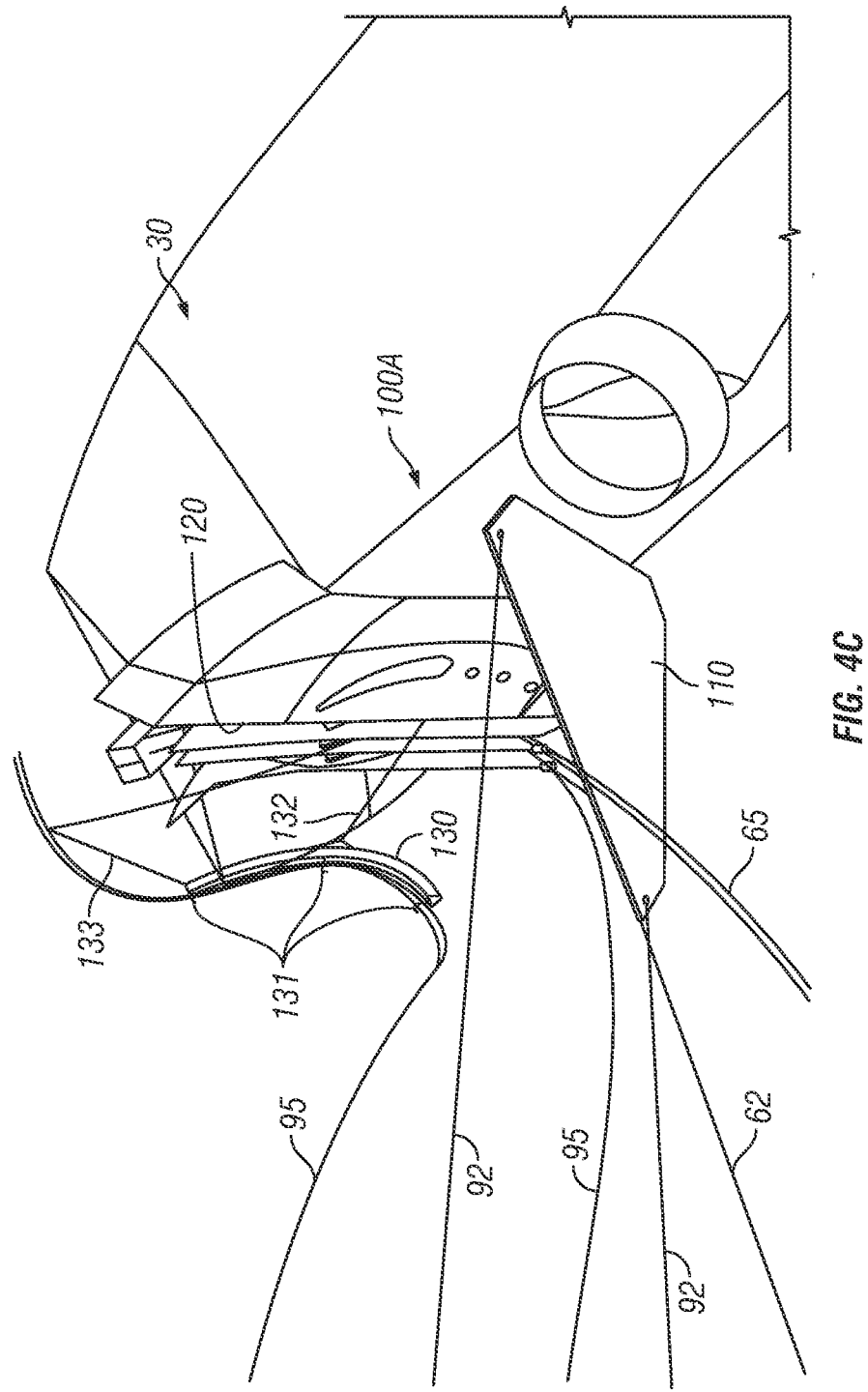

Details of how cables 65/95 are deployed and retained in the skeg 100A are provided in FIGS. 4A-4C. In this arrangement, operators deploy the streamers 60 (one shown), sources 90 (two shown), cables 65/95, towlines 62/92, and other components in the water from the vessel 30 in a conventional manner. As is typically the case, the steamer 60 can be deployed with a number of sensors and devices (not shown) attached thereon. The sensors can determine the steamer's speed in the water, heading, etc. The devices can control the positions of the steamer 60 while being towed. Therefore, components of the system 10A may be done in an area significantly clear of ice (i.e., outside an overly icy region to be surveyed) because the cables 65/95 and towline 62/92 may need to come off the vessel's stern and pass directly in the water without protection with the skeg 100A.

Once the steamers 60, source 90, and other components are towed out into the water, the streamer cables 65 and source cables 95 are deployed with bend limiters 130 disposed thereon and connected with towlines 133 to the skeg 100A. The bend limiter 130 can define a bend to help tuck the cable 65/95 in the skeg 100A's channel 120 as discussed below. Rings or other couplings 131 on the limiters 130 may allow it to attach to the cables 65/95, while also allowing it to slide along the cable 65/95 when pulling them into the skeg's channel 120.

A slack line 132 extends from a winch 134a to a passage in the skeg 100A. Support cables 133 may also hold these limiters 130 in position and may attach to winches 134b on the vessel 30. Operators use the slack winch 134a to bring in the slack line 132. This pulls the limiter 130 (and attached cable) into the channel 120 of the skeg 100A. This processes is repeated for each of the cables (either source or streamer) to be protected in the skeg's channel 120. A series of slots 121 can be provided along the vessel's aft 32 at the top of the skeg's channel 120 to accommodate any lines or cables passing into the skeg's channel 120.

Once the cables 65/95 have each been pulled into the channel 120 with the limiters 130 and all towlines secured, the vessel 30 can then travel to icier region to survey. As it encounters ice floes, the skeg 100A can then protect the cables 65/95 extending from the vessel 30 and hold the tow points for their towlines 62/95 under the surface of the water.

Figure 5:
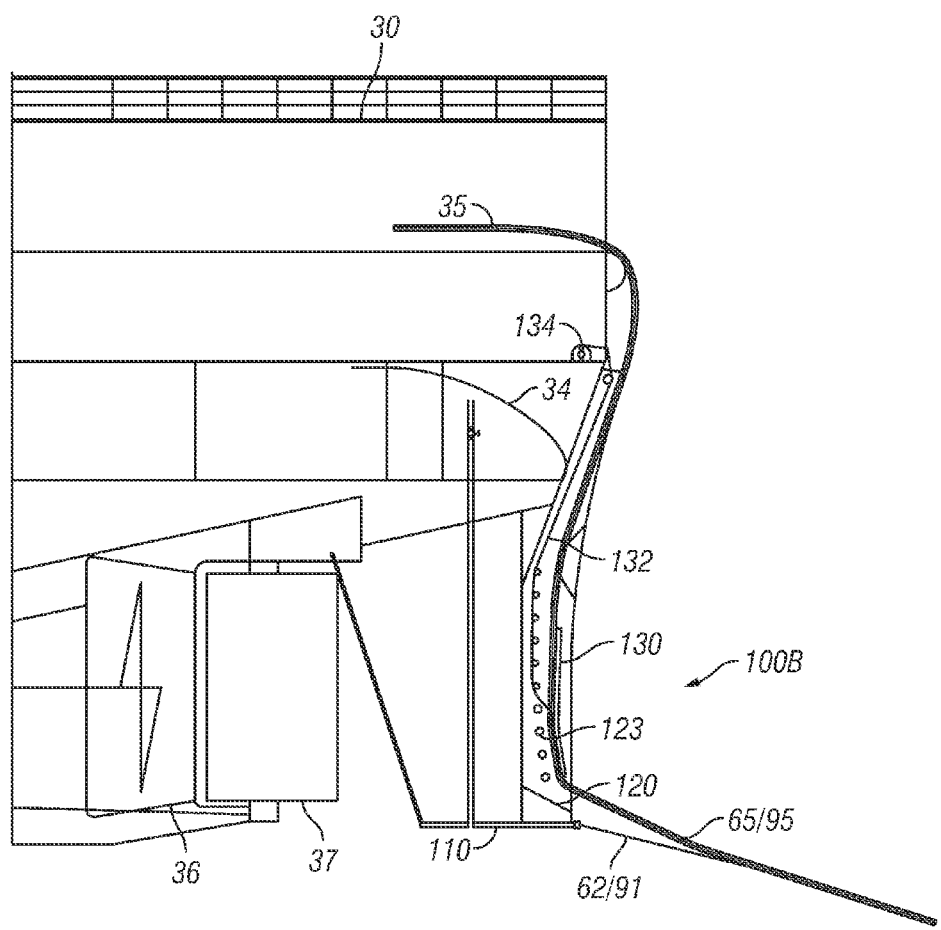
FIG. 5 is a side view of another ice skeg partially exposed.

An alternate ice skeg 100B in FIG. 5 is similar to the previous skeg 100A. In this skeg 100B, the channel 120 of the skeg 100B has a plurality of cross bars 123 for support. These bars 123 also provide gaps for passage of the slack lines 132 for the limiters 130 used to pull and retain the cables in the skeg's channel 120. As will be appreciated from these and other ice skeg designs disclosed herein, the ice skeg 100 can have more or less complicated features depending on the implementation.

C. Multiple Conduit Skeg

The previously described skegs 100A-B provide a single conduit down the center of the vessel's aft 32, which may be best suited for a vessel 30 with dual screws 36. As an alternative, an ice skeg 100C in FIGS. 6A-6B provides two or more conduits or passages down a vessel's aft 32 and can be used with a vessel 30 having one screw 36 and rudder 37.

Figure 6A:
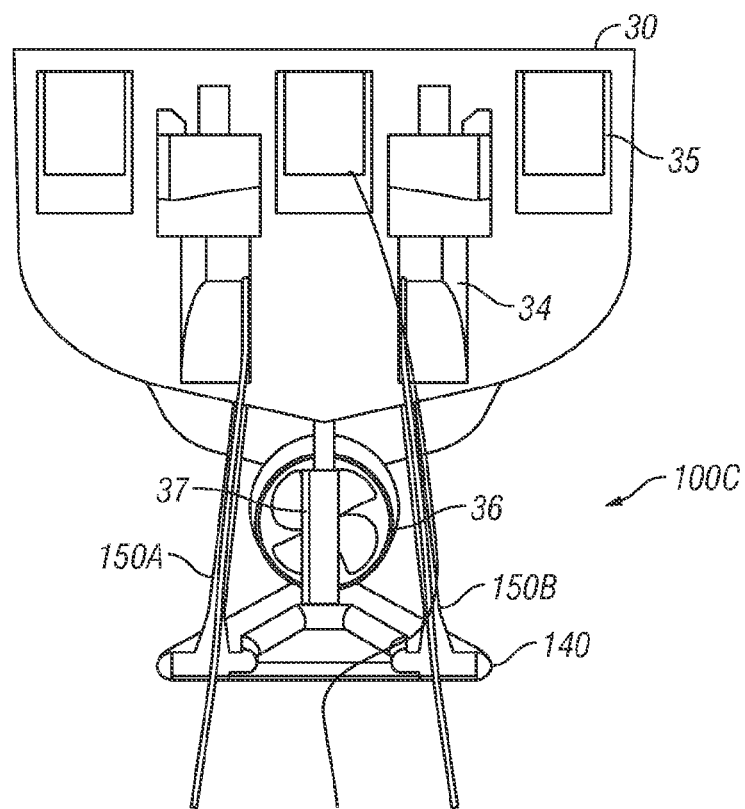
FIG. 6A is an aft view of a vessel having a dual channel ice skeg according to the present disclosure.

As shown in the aft view of FIG. 6A, the skeg 100C has dual channels 150A-B that pass from the aft 32 of the vessel 30 and under the surface of the water on either side of the vessel's screw 36. In this way, the wake of the screw 36 and rudder 34 of the vessel 30 can remain relatively unobstructed in the open space between the channels 150A-B.

Figure 7A:
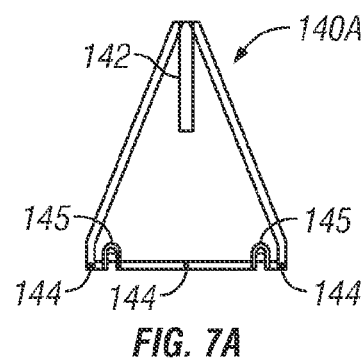
FIGS. 7A-7B shows plan views of blades for the dual channel ice skeg.

As also shown, the distal ends of these dual channels 150A-B connect to the rear edge of a base plate 140. The base plate 140 can have different shapes. As shown in FIG. 7A, for example, one type of base plate 140A can be a closed, triangular shape with a front edge 142 for attaching to the vessel's keel (38) by welding or other technique. Alternatively, in FIG. 7B (and FIG. 6A), another type of base plate 140B can define an opening 146 therein, which can reduce the overall weight of the plate 140B. In either case, the plate 140A-B itself can contain hollow chambers to reduce weight and can be filled with buoyant materials.

Figure 6B:
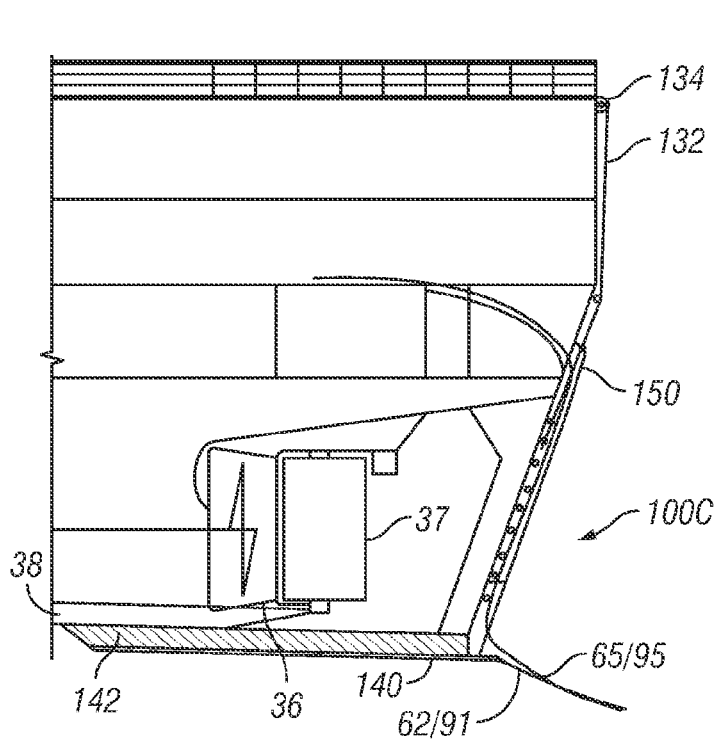
FIG. 6B is a side view of the dual channel ice skeg in partial cross-section.
Figure 7B:
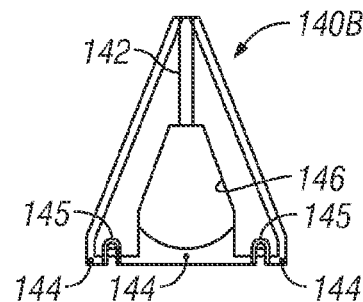

As best shown in FIG. 6B, the base plate 140 at its front end 142 connects to the keel 38 of the vessel 30. As with previous designs, the base plate 140 has tow points 144 for attachment of towlines 62/92 used to support the streamers and source of the seismic system. As shown in FIGS. 7A-7B, for example, these tow points 144 can lie along the tailing edge of the plate 140. In addition, attachment points 145 for the channels 150A-B are also provided on the trailing edge of the plates 140A-B.

D. Source Arrangements

1. Horizontal Source

As noted previously, embodiments of the marine seismic survey systems can use a horizontal source. FIGS. 8A-8D show arrangements of marine seismic survey systems 10B using horizontally configured sources 250 towed off the ice skeg 100 on the tow vessel 30. As shown, each source 250 has gun plates 252 interconnected by lines 254. In addition, each source 250 connects by a towline 220 and a buoyant supply line 230 to the ice skeg 100 on the vessel 30 according to the techniques discussed previously. Each source 250 in turn positions relative to a streamer cable 65 extending from the ice skeg 100 and supported by a towline 62.

When performing the survey, the source 250 is preferably stabilized at a predetermined or known depth in the water. As noted previously, the source 250 can be supported by a conventional floatation device having one or more sausage floats (not shown) that float at the water's surface. Naturally, using such conventional floats to support the source 250 in icy waters is the easiest form of implementation.

Because ice moves along the surface of the water, attention is preferably paid to interference by ice with such a surface floatation device. Accordingly, the surface floatation device can be shaped to minimize impacts with ice can be arranged to cut through any ice floes. For example, the surface floatation device can have several surface floats interconnected to one another, and each float can have a shape conducive to avoiding ice. In addition, the linked surface floats can be connected by a towline at the water's surface to the stern of the vessel 30.

When surveying in icy waters, however, such a conventional surface floatation device may be constantly battered by ice and may become dislodged by ice being caught by vertical ropes connecting the floats to the horizontal source 250. To support the source 250, the disclosed system 10B preferably uses floatation devices 200A-D as shown in FIGS. 8A-8D that tow below the surface of the water or are less subject to ice impacts.

a. Flotation Devices

Figure 8A:
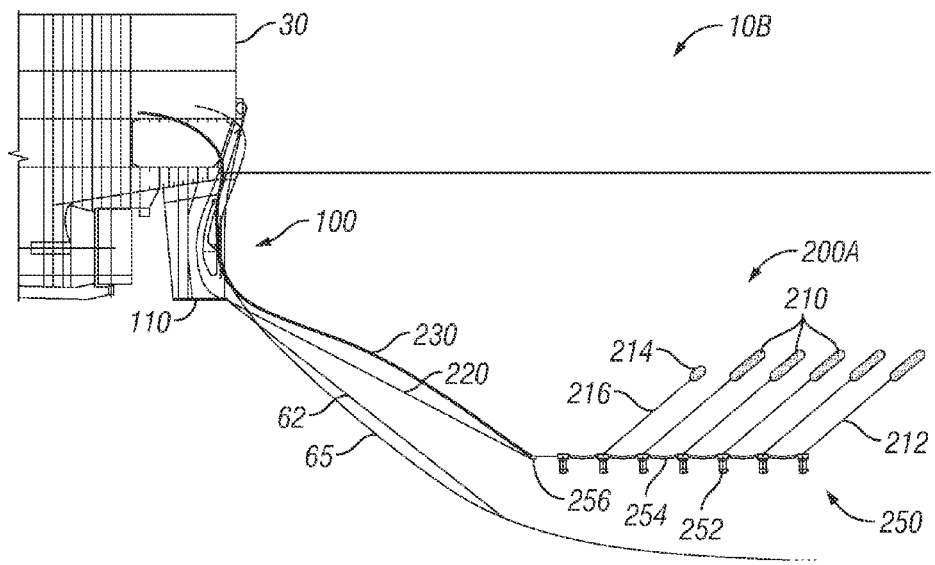
FIGS. 8A-8D illustrates flotation systems according to the present disclosure for a horizontal source towed behind a vessel with a skeg.

In FIG. 8A, a first floatation device 200A has individual buoys 210 that support the horizontal source 250. At least some of the source's plates 252 are individually connected to one of the buoys 210 by a cable 212. This allows each buoy 210 to move around and under ice at or below the water's surface. In general, the buoys 210 may be allowed to float at the surface. In the device 200A in FIG. 8A, however, the buoys 210 are preferably set up to float below the surface of the water when towed behind the ice skeg 100. Because the skeg 100 brings the tow and supply lines 220/230 below the water's surface, the source 250 and buoys 210 can be better supported below the surface of the water and away from any ice floes.

To reduce issues with entanglement, the buoys 210 as shown can be tethered by short lines 212 so that they float at about 4-8 meters below the water's surface when towed. In general, the length of these lines 212 may be about 6-m, and the tow depth of the source 250 may be about 19-m.

In addition to shorter lines 212, not all of the source plates 252 may be supported by a buoy 210 and a line 212. In this example, a first source plate 252 can be supported on its own between the coupling 256 of the tow and supply lines 220/230 to the source 250. A shorter front buoy 214 and line 216 can then support the second source plate 252, and the remaining five source plates 252 can be supported by the larger buoys 210 and longer lines 212. The smaller buoy 214 may have a length of about 1-m., while the larger buoys 210 have a length of about 2.5-m. In other arrangements, each source plate 252 can having its own buoy 210 connected by a line 212. Additionally, the coupling 256 of the towline 220 and supply line 230 to the source 250 can be supported by its own buoy and line (not shown).

When towed behind the skeg 100, the buoys 210/214 submerge. This provides stability to the buoys 210/214 and reduces issues with them wandering about and being impacted by ice floes. Although initially unexpected, the source 250 can actually float at a substantially consistent depth while being supported by the individually tethered buoys 210/214. In essence, the interplay between the drag from the submerged buoys 210/212, the tow speed, the holding off of the source 250 from the skeg 100, and other factors make the source 250 neutrally buoyant in the water. Using more or less buoys 210/214 can aid in stabilizing the depth of the source 250 depending on the implementation.

Figure 8B:
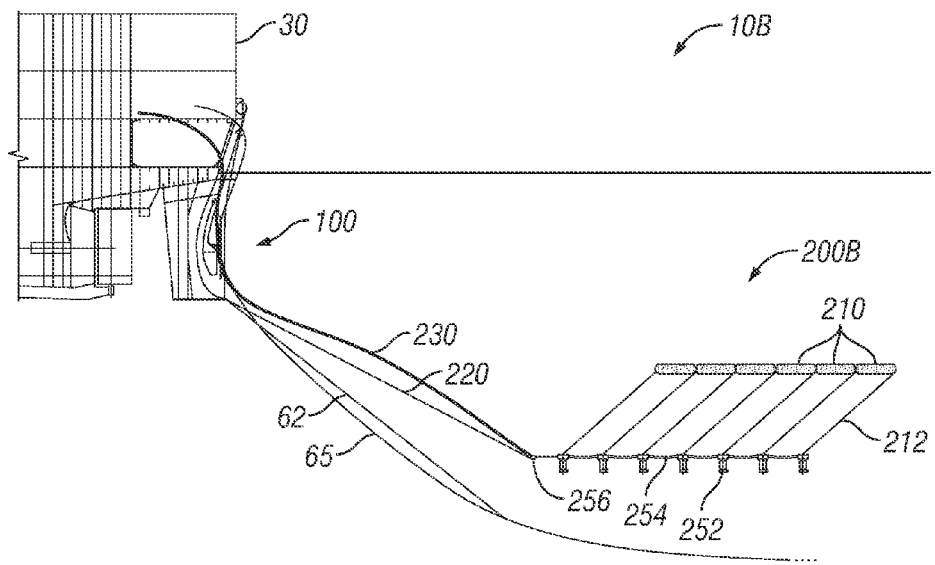

To stabilize the depth of the source 250, the floatation device 200B in FIG. 8B has the buoys 210 arranged together in a horizontal manner. The number of buoys 210 used can be adjusted so that the source's buoyancy will be neutral. In this arrangement, the multiple buoys 210 are tethered at one end by lines 212 to individual gun plates 252 of the source 250, and the other ends of the buoys 210 connected to the ends on the adjacent buoys 210. Thus, each buoy 210 is flexibly connected to the adjacent buoys 210. As an alternative to flexibly connected buoys 210, the floatation device 200B may use one single elongated buoy (not shown) held by tether lines 212 and intended to float below the water's surface when towed.

Figure 8C:
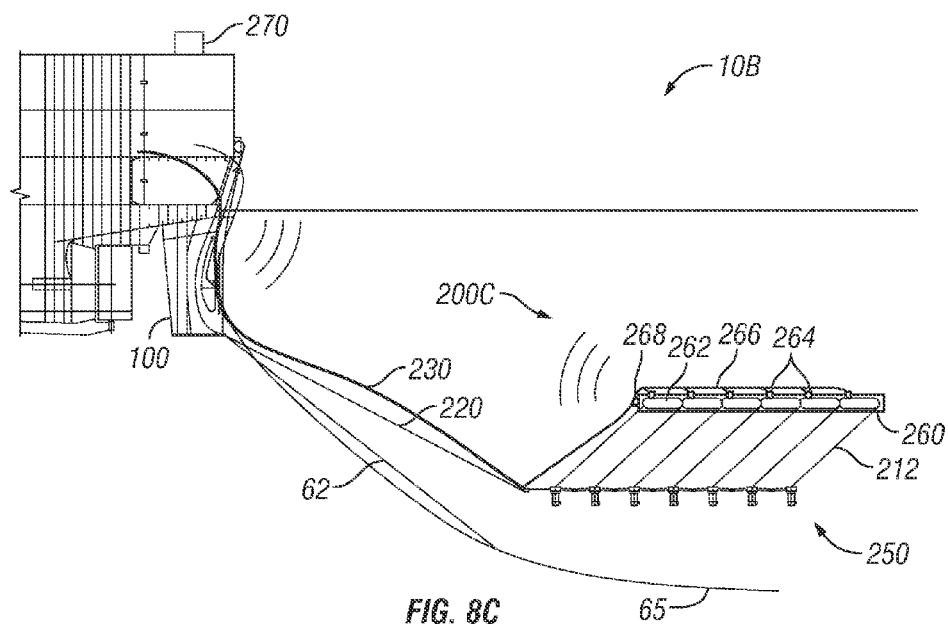

As another alternative, the floatation device 200C in FIG. 8C uses an elongated float 260. Internally, this float 260 is compartmentalized by several volumes (e.g., bladders or chambers) 262 along its length. As opposed to an elongated, compartmentalized float as shown, the floatation device 200C may comprise several individual floats either individually tethered or flexibly connected together (as in FIGS. 8A-8B), and one or more of these float can have a fillable volume for buoyancy control. When the float 260 is towed behind the skeg 100, these volumes 262 can be selectively inflated or flooded as required to maintain a desired depth for the source 250.

For example, elements 264 can be regulators, and a tap off line 266 from the source's supply cable 230 can connects to the regulators 264 for each of the volumes 262. The regulators 264 can add or release air in the volume 262 to control the buoyancy of the float 260. In this way, the float 260 can be maintained at a desired level and remain unaffected by surface obstructions or wave action. In another example, the regulators 264 can be high-pressure water pumps, and the volumes 262 can be filed with pressurized air and/or water that can be controlled.

In either case, a controller 268 monitors and controls the operation of the regulators 264, and the controller 268 can connect to depth indicators on the source plates 252 to determine and monitor the depth and orientation of the source 250. As is known, the buoyancy of the device 200C can depend on the salinity of the water, the temperature, and other factors so the controller 268 may preferably be capable of local or remote control. Although GPS would not work to position the float 260, the controller 268 can communicate with a control unit 270 on the vessel 30 by acoustic signals or an electric cable on supply line 230 so that the control unit 270 can operate the controller 268 to change and adjust the position (i.e., depth) of the float 260 during surveying. This flotation device 200C can also incorporate components related to a Remotely Operated Towed Vehicle or glider buoy and any buoyancy, pitch, and roll control components disclosed herein.

Figure 8D:
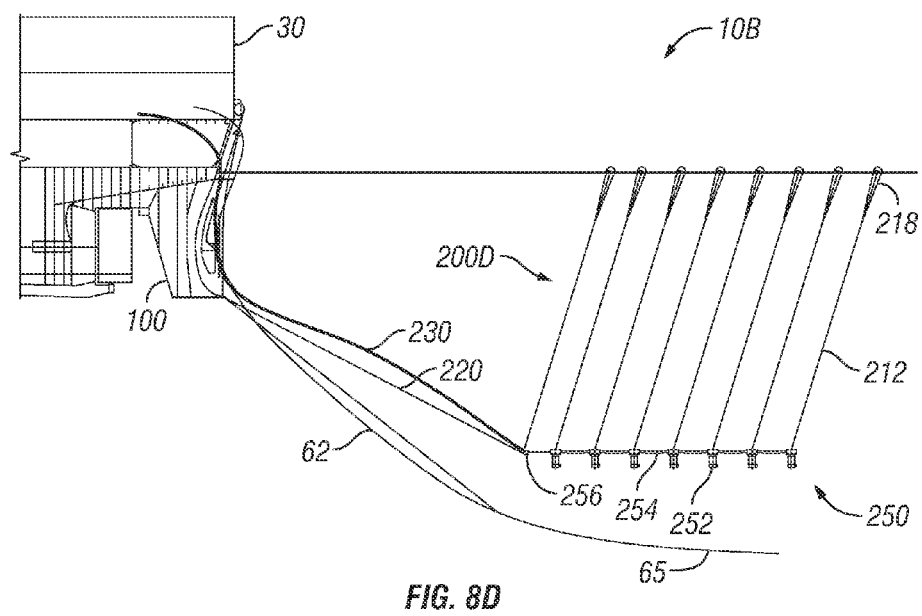

In yet another arrangement, the floatation device 200D in FIG. 8D uses chutes or drogues 218 connected by lines 212 to support the source 250. These drogues 218 are designed to drag along the surface while the source 250 is towed. Should the drogues 218 impact with any ice floes, the individual drogue 218 can absorb the impact and then return to catching water at the surface without significantly disrupting the support of the source 250 by the other chutes 218. As also shown, the coupling 256 of the source 250 to the cables 220/230 can be supported by a drogue 218 and line 212 as well.

Although not shown in FIGS. 8A-8C, the skeg 100 can support more than one source 250 and floatation devices 200A-D behind the vessel in a way similar to that shown in FIG. 4A. Furthermore, although one streamer cable 65 is shown in FIGS. 8A-8C, it will be appreciated with the benefit of this disclosure that multiple streamer cables 65 or an array of such cables 65 can be towed from the skeg 100.

b. Buoys

Figure 9A:
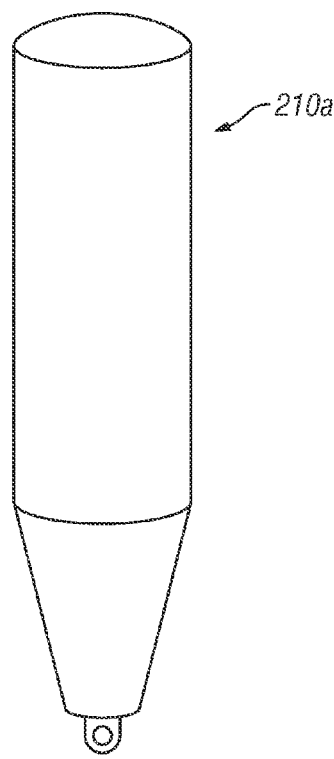
FIGS. 9A-9B illustrate buoys for the floatation systems according to the present disclosure.
Figure 9B:
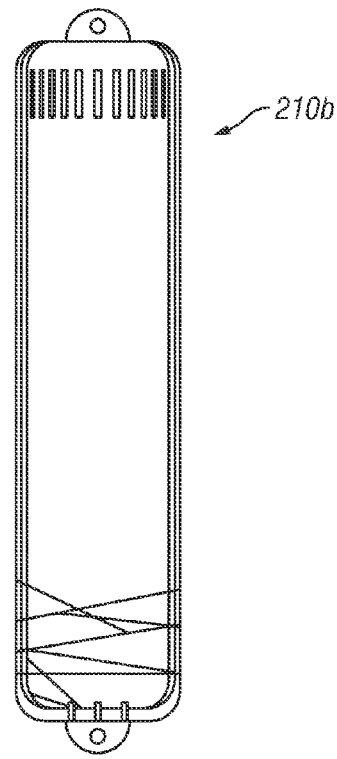

The particular buoys 210 used for the floatation devices 200A-B of FIGS. 8A-8B preferably produce little drag and shed ice. In addition, the buoys 210 are preferably resilient to cold water and can handle impacts with ice. In FIG. 9A, one buoy 210a is shaped as an elongated spar and has a cylindrical body with a tapered end intended to reduce drag and cut through ice floes and water. In FIG. 9B, another buoy 210b has a cylindrical body.

The construction of these buoys 210a-b can be similar to that used for ice spar buoys typically used to mark navigation channels in areas that freeze in winter. One manufacturer of such an ice spar buoy is Sabik of Finland. When used to support a source (250), these types of buoy 210a-b can function well in icy waters.

On both of these buoys 210a-b, a front coupling at the end can connect the buoy 210a-b by a tether line (not shown) to the source (not shown). Another coupling may be provided on the other end to facilitate handling of the buoy 210a-b or to tie it to other buoys as in the arrangement of FIG. 8B. In general, the buoys 210a-b may be about 2.5-m in length or shorter and may be about 0.5-m in width, and the buoys 210a-b may be designed to provide approximately 25% reserve buoyancy.

For both buoys 210a-b, the bodies are preferably formed out of an outer shell of strong plastic material, such as Ultra-High Molecular Weight Polyethylene (UHMWPE) or UV polyethylene that will resist cracking, chipping, and peeling in cold conditions. The wall thickness is preferably 20-mm or more. Internally, the buoys 210a-b can have reinforcement such as ribs or plates, and the buoys 210a-b may be filed with closed cell foam, such as polyurethane foam.

2. Vertical Source

Figure 10:
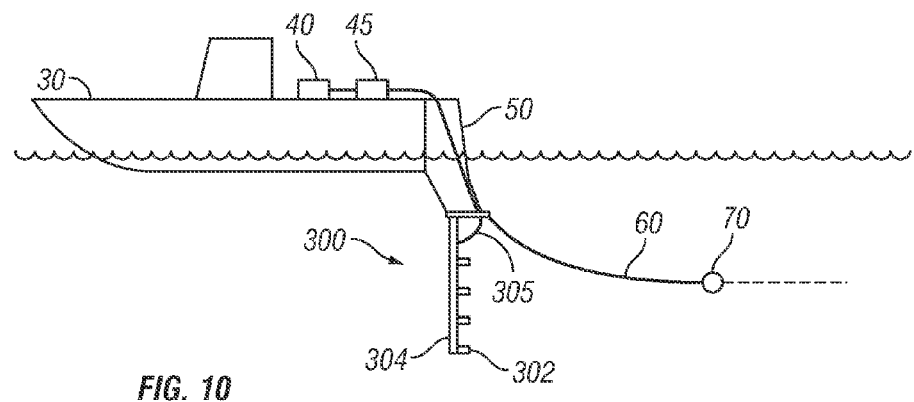
FIG. 10 shows a vertical source disposed below an ice skeg.

As noted previously, embodiments of the surveying system can use a horizontal gun array for the seismic source. As an alternative shown in FIG. 10, the system can use a vertical source 300 disposed below the ice skeg 50. The vertical source 300 can be fixedly attached to the ice skeg 50 using a stem or mast 304 that extends down through the ice skeg 50. This mast 304 may be deployable through a vertical channel (not shown) in the ice skeg 50 or may be affixed to the end of the ice skeg 50 while in the water.

Alternatively, element 304 of the vertical source 300 can include cables connected to the ice skeg 50 and extending therefrom. To keep the source 300 vertical (or at least in a vertical orientation) while being towed, an arrangement of one or more floats, ballast, fins, vanes, or the like (not shown) can be provided on the vertical source 300 so that it tows substantially vertical in the water while the vessel 30 is surveying. Although shown strictly vertical from the skeg 50, the source 30 may be configured to tow at some predetermined angle that is relatively vertical.

The vertical source 300 has multiple source elements or guns 302 connected to a supply system 45 by a supply line 305. Timing of the guns 302 can be performed in a way to create a large, single source signal by firing each of the guns 302 in the source 300 into the acoustic pulse produced by other firing guns 302. For example, the supply system 45 fires the highest gun 302A first. Then, the supply system 45 fires the next highest gun 302B at an appropriate point in time so that it fires into the downward acoustic pulse produced by the first gun 302A. This sequence continues down the vertical source 300 of guns 302 so the source 300 can operate essentially as a single source located at about the center of the array of guns 302. The timing can also be done so that the resulting acoustic pulse is downward facing.

Unfortunately, the vertical source 300 may not remain perfectly vertical (or at its predetermined vertical orientation) in the water while being towed. Swells, encounters with ice, flexible connection of the source 300 to the skeg 50, and other issues will cause the source 300 to move from its vertical (or predetermined orientation). This alters the locations of the guns 302 and alters how their timed firing should be performed. Left unaccounted for, this tilting can alter the fidelity of the seismic source signal produced by the source 300 and the resulting data acquired.

Figures 11A, 11B, 11C:
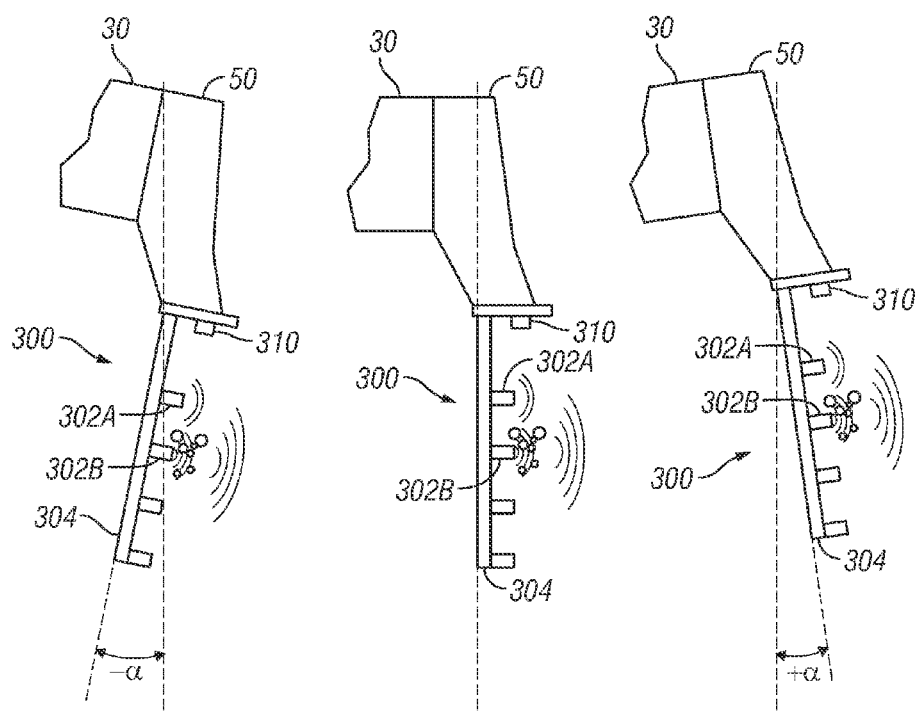
FIGS. 11A-11C shows the vertical source in different tilt arrangements.

As shown in FIGS. 11A-11C, the vertical source 300 can tilt at some tilt angle $\pm\alpha$ relative to its predetermined orientation, which is vertical in this example. The vertical source 300 determines this tilt angle $\pm\alpha$ and adjusts the timed firing of the guns 302 accordingly.

The tilt angle $\pm\alpha$ of the source 300 can be determined in a number of ways. As shown, an inclinometer or other type of sensor can be used to determine the tilt angle $\pm\alpha$ of the source 300. Once known, this tilt angle $\pm\alpha$ is used to adjust the timed firing the guns 302 to maintain the fidelity of the source signal and to make the direction of the source signal downward facing. The timing of the firing of the guns 302 is therefore preferably based on the variable tilt angle $\pm\alpha$ of the source 300 and each guns 302 location. By manipulating the timing of the guns 302 based on the variable tilt angle $\pm\alpha$, the resulting source signal produced can keep its high fidelity and can remain preferably downward facing.

Briefly, the supply system 45 fires the highest gun 302A first. Then, the supply system 45 fires the next highest gun 302B at an appropriate point in time adjusted by the variable tilt angle $\pm\alpha$ so that it fires into the downward acoustic pulse produced by the first gun 302A. This sequence then continues down the vertical source 300 of guns 302. If the variable tilt angle $\alpha$ is negative (FIG. 11A), then timing between firings may be lengthened. Alternatively, the timing may be shortened for some guns 302 if the variable tilt angle $\alpha$ is positive (FIG. 11C). Although the timing between firings may be changed, the sequence of firings of the guns 302 may also be altered depending on the implementation.

E. Deployed Devices for Survey System

During marine seismic surveying, it is desirable to determine, track, and potentially control the positions of the streamers to better acquire and map the seismic data obtained. Determining position can be done using GPS readings of the streamers during the survey. In the marine seismic surface systems 10 of the present disclosure, however, obtaining GPS readings can prove difficult because the system 10 is significantly submerged below the water's surface so that GPS receivers cannot operate to obtain readings. Discussion now turns to several types of deployed or controllable device that can be used on the streamers to obtain GPS readings and otherwise control the position of the streamers during surveying.

1. Floating Deployed Device

In FIG. 12A, a marine seismic survey system 10C is shown having a first type of deployed device 80A according to the present disclosure. During a marine seismic survey, the locations of the streamers 60 are controlled and monitored so that the positions of the array of sensors 70 can be known for proper data acquisition and analysis. For example, GPS coordinates of the streamers' tail ends can be used to coordinate the position of each of the sensors 70 on the various streamers 60, and a control system 40 uses these coordinated positions for data acquisition, analysis, and control. A suitable system for acquisition, analysis, and control includes ION Geophysical's Intelligent Acquisition system that can determine the locations of the streamers 60. Such a system can steer the streamers 60 using DIGIFIN™ streamer steering systems and ORCA® command control software, which are available from ION Geophysical. (DIGIFIN is a registered trademark of ION Geophysical, Corporation, and ORCA is a registered trademark of Concept Systems Holdings Limited.)

In the present survey system 10C, the streamers 60 travel submerged below the water's surface using the skeg 50 and other features disclosed herein. Yet, it is still necessary to determine the locations of the streamers 60. To obtain the location of a given streamer 60, the system 10C in FIG. 12A uses the deployed device 80A that floats on the water's surface at the tail end of the streamer 60.

The deployed device 80A can be a spar type buoy designed to handle ice impacts and shed ice floes while at the surface. The device 80A includes a GPS receiver 82 that can obtain GPS coordinates for the deployed device 80A as it is towed behind the vessel 30 with the streamer 60. Obtaining the GPS coordinates can use conventional techniques known in the art so that they are not detailed herein. For example, details related to GPS-based positioning of an underwater streamer cable 60 can be found in U.S. Pat. No. 7,190,634, which is incorporated herein by reference.

As the vessel 30 tows the streamer 60, the source 90 produces source signals, and the sensors 70 detect seismic signals. The control system 40 obtains GPS coordinates from the deployed device 80A using the streamer 60 and other lines for communication and power to the GPS receiver 82. Then, using techniques known in the art, the control system 40 determines the location of streamer 60, sensors 70, source 90, and other components relative to the vessel 30 and physical coordinates of the area being surveyed.

Although the marine seismic survey system 10C of FIG. 12A uses the floating deployed device 80A, this is generally possible as long as the surfaced device 80A is designed to encounter a certain amount of ice floes, obstacle, or the like. Otherwise, the surfaced device 80A can become bogged with ice, damaged by impacts, moved out of place, or lost. Therefore, in some situations, a submersible form of deployed device may be used as described below.

2. Controllable Deployed Devices

Figure 12B:
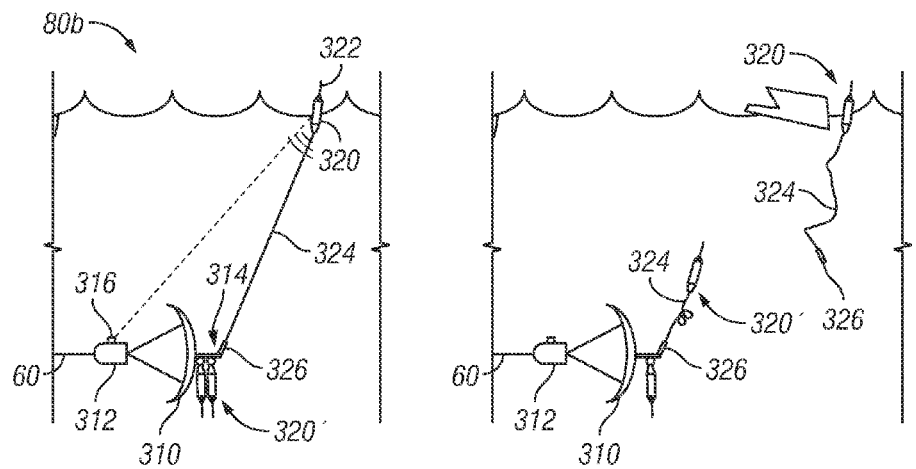

The previous deployed device 80A was intended to float at the surface. In FIG. 12B, a deployed device 80B includes a drag producing device 310 and a buoy 320. As shown, the drag producing device 310 can be a drogue, although any other apparatus known in the art can be used. The drogue 310 is attached to the tail end of the streamer 60, and a module 312 may be provided that houses various electronic components, such as declinometer, compass, inertial navigation system, and the like.

The drogue 310 produces drag as the steamer 60 is towed, and the position (depth, lateral, etc.) of the steamer 60 can be controlled by other techniques disclosed herein. The buoy 320 extends off from the tail end of the streamer 60, drogue 310, or module 310 by a connector 324 and a mechanical coupling 326. The connector 324 preferably produces low drag.

Depending on how it is arranged, the buoy 320 can permanently float at the surface by the connector 324 or may be able to move to and from the surface when encountering ice. For example, the connector 324 can be a fixed mast that extends off the tail end of the streamer 60, and the mechanical coupling 326 can be rotatable. Preferably, however, the connector 324 is a flexible tether line of low drag, and the mechanical coupling 326 is preferably breakable at a predetermined tension.

Again, the buoy 320 is preferably a spar type buoy of resilient plastic construction to withstand encounters with ice and the like. The buoy 320 also preferably has sufficient ballast. Thus, as the buoy 320 floats at the surface, it is intended to shed ice floes and bounce away from ice and then return to the surface when accessible.

The buoy 320 has a GPS receiver 322 that exposes above the surface of the water (and preferably above any swells) to obtain GPS readings as long as the buoy 320 is at the surface. As it is towed, the buoy 320 obtains these GPS readings continuously and communicates them to the electronics module 312 on the steamer 60 either via the line 324, acoustically, or other method. If the buoy 320 encounters ice, the buoy 320 can be forced below the surface of the water. If this occurs for a prolonged period of time, the survey system can use the components in the electronics module 312 to keep determining position of the tail end of the streamer 60 in ways discussed later.

As noted herein, it is preferred to determine the location of the tail end of the streamer 60 so the survey system can track the location of the sensors (not shown). Because it exposes at the surface, the buoy 320 obtains the GPS readings. Yet, the buoy 320 lies some distance (e.g., 20-m) from the tail end of the streamer 60. Therefore, locating the tail end of the streamer 60 must be determined from the known information.

In one method, the distance may be known due to the depth of the streamer 60, the predetermined length of the line 324, the tow speed, and other variables. Based on the mathematical relationship, the location of the tail end of the streamer 60 (e.g., the location of the module 310) can be directly calculated. In another method, the buoy 320 may ping an acoustic signal that is picked up by a sensor 316 on the module 312, and this information can be used to determine the location of the tail end of the streamer 60 relative to the buoy 320 to correct for location. Each steamer 60 towed from the vessel can have such a buoy 320 and acoustic sensor 316 so that acoustic signals detected between steamers 60 and buoys 320 can use cross-bracing techniques. This can then further triangulate the orientation of the buoys 320 and steamers 60 and help determine locations.

As it floats at the surface, the buoy 320 may become bogged down and caught in ice. As some predetermined tension, however, the mechanical coupling 326 can break free so that the stuck buoy 320 can be shed from the end of the streamer 60. Only a buoy 320 and GPS receiver 320 may then be lost, while other potentially more expensive electronics in the module 312 remain in place on the end of the streamer 60.

Although the deployed device 80B may have one such buoy 320, it preferably has one or more such buoys 320' in reserve in case the first buoy 320 is lost. Accordingly, the deployed device 80B can be controllable to release reserve buoys 320' when needed.

As shown, the reserve buoys 320' can be held to the end of the streamer 60 in an undeployed condition. If the currently deployed buoy 320 breaks free, a mechanical activator 326 can release the next reserve buoy 320' in line. Tethered by its line 324 and coupling 326, this released buoy 320' begins to float to the surface of the water to expose its GPS receiver 322 to obtain readings. The mechanical activator 314 can be a solenoid operated latch or other electronic device and can be operated manually from the vessel (not shown) via the streamer 60 or operated automatically by electronics in the module 312.

Figure 12C:
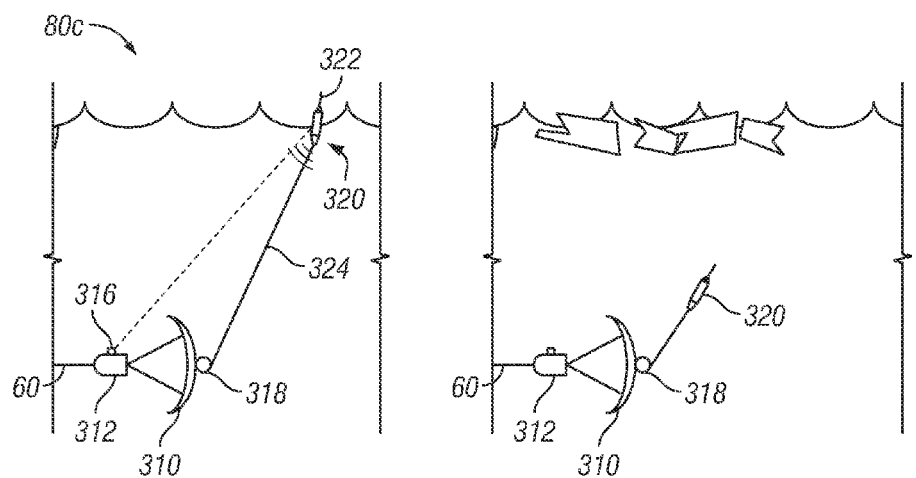

In FIG. 12C, another controllable deployed device 80C again includes a drag producing device or drogue 310 and a buoy 320. The buoy 320 extends off from the tail end of the streamer 60 with a low drag tether line 324. In addition, the buoy 320 may be intended to shed ice floes and bounce away from ice and then return to the surface when accessible. Should the surface ice become too problematic, however, a winch 318, reel, or the like can be driven by a motor to pull the line 324 and buoy 320 back under the surface. Operators can operate the winch 318 to release the buoy 320 when the conditions improve. This deployed device 80C can also use many of the other features disclosed above.

As shown in FIG. 12D, the marine seismic survey system 10D has a controllable deployed device 80D whose depth can be controlled. During surveying, the deployed device 80D is towed on the end of the streamer 60 below the surface of the water to avoid impacts with ice floes. To obtain GPS readings, the deployed device 80D has a GPS receiver 82a that can be brought to the surface by controlling the depth of the device 80D. Therefore, the deployed device 80D is preferably towed below the surface in line with the streamer 60 and is brought to the surface to obtain GPS readings with the receiver 82d at appropriate times.

Figure 13A:
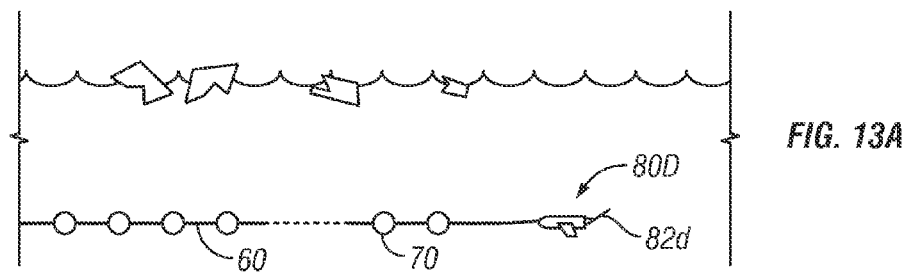
FIGS. 13A-13B illustrate one type of controllable device in two operating conditions.
Figure 13B:
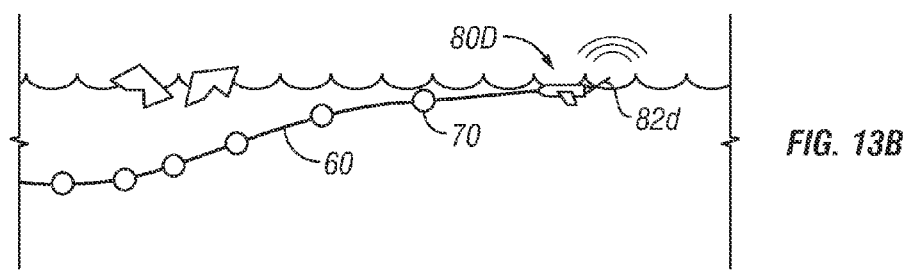

FIGS. 13A-13B illustrate the deployed device 80D in two operating conditions. In its standard gliding condition of FIG. 13A, the deployed device 80D follows behind the streamer 60 underwater. This position is suitable when ice floes, obstructions, or the like are at the surface of the water that can damage or obstruct the deployed device 80D. When a clearing develops at the surface, the deployed device 80D can be raised to the surface so that the GPS receiver 82d can obtain GPS readings. To map the array of streamers 60 and sensors 70 adequately, these GPS readings may need to be made at periodic intervals so the location of the streamers 60 and sensor 70 can be sufficiently tracked.

The deployed device 80D can be a controllable vehicle, device, or glider. In one arrangement, for example, the deployed device 80D can be a Remotely Operated Vehicle (ROV) having a propulsion system and controllable fins or the like to steer the deployed device 80D to desired positions in the water as it is towed. Alternatively, the deployed device 80D can be a towed glider that moves up or down using buoyancy control, as described in more detail latter. In yet another alternative, the deployed device 80D can be a Remotely Operated Towed Vehicle (ROTV) lacking a propulsion system but having controllable fins, as also described in more detail latter.

Figure 14:
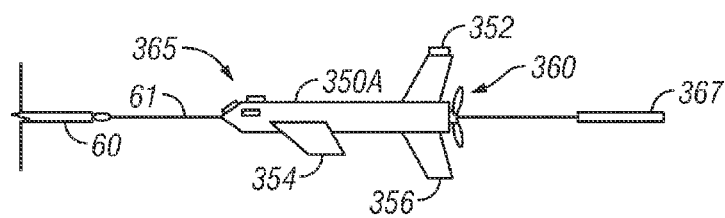
FIG. 14 illustrates an embodiment of a controllable device according to the present disclosure.

FIG. 14 illustrates an embodiment of a deployed device or controllable vehicle 350A for the disclosed marine seismic system. The vehicle 350A attaches to the end of the seismic streamer 60, which provides power and communications for the vehicle 350A. A tether 61 can be used for this purpose. Fins 354/356 on the vehicle 350A may be movable, and the vehicle 350A can have a propulsion system 360, such as a propeller. Alternatively, the fins 354/356 do not need to be movable. Instead, the vehicle 350A uses buoyancy control, as described below. Likewise, the vehicle 350A does not use propulsion, and the system 360 on the vehicle 350A may actually be a brake, as also described later.

As shown, the vehicle 350A has a detector 365 for detecting surface obstructions. This detector 365 can include sonar, ice profiler, optical sensor, multi-beam fathometer, camera, or the like that is upward looking and monitors for obstructions (or clearings) above the vehicle 350A. Signals from the detector 365 can be integrated with a navigation and/or control system (not shown) for acquiring marine seismic data, such as the Orca® system. In this way, the control system can determine when the surface above the vehicle 350A is free of ice and can signal the vehicle 350A to rise to the water's surface.

As one example, the detector 365 can use sonar to detect when ice is present at the surface. For example, if ice of a particular thicknesses is present at the surface, the sonar detector 365 may detect this surface ice, and this information can then be used for determining whether the vehicle 350A is raised or not. Although this depends on its capabilities, the sonar detector 365 is preferably able to detect thinner ice that is at least less than 1-m thick so the vehicle 350A can be protected from most surface ice that may be present.

As another example, the detector 365 can be an optical sensor that determines available light at the surface, which may indicate the presence or absence of ice. Along these lines, the detector 365 can be a digital camera that feeds video or images along the streamer 60 to the towing vessel. The tail ends of the streamers 60 can lie a significant distance from the tow vessel, and operators will not be able to determine where the streamers 60 are and what ice may be over the vehicles 350A. Therefore, operators can view the video or images from the camera 365 and determine whether to raise a particular vehicle 350A or not if a clearing is present. This can then be done remotely by activating the vehicles 350A with signals communicated from the vessel to the vehicles 350A via the streamers 60.

The vehicle 350A also has a GPS receiver 352. As shown, this GPS receiver 352 can be located on an upward fin 354 so that the antenna 352 can peek above the surface of the water when the vehicle 350A glides to the surface for acquiring GPS readings. Regardless of how the GPS receiver 352 is surfaced, the GPS readings obtained are communicated to the instrument control system for positioning the streamer 60 and determining its location for proper data acquisition and analysis.

Because continuous GPS readings may not always be available, the vehicle 350A may include a compass or declinometer 367, which can be tethered from the end of the vehicle 350A to keep it away from any interfering electronics. The declinometer 367 can use a single-axis magnetometer to measure declination in the Earth's magnetic field, and the declination can then be corrected to a true north reading so the instrument control system can determine the position of the end of the streamer 60 in the absence of GPS readings usually used for that purpose.

The vehicle 350A intermittently gets GPS readings by going to the surface to obtain GPS data with the GPS receiver 352. Then, diving under the surface, the vehicle 350A can use the previously obtained GPS data along with inertial navigation data, compass readings, and current declinometer data to determine the real-time or near real-time location of the streamer 60 on an ongoing bases until new GPS readings can be obtained.

Figure 15:
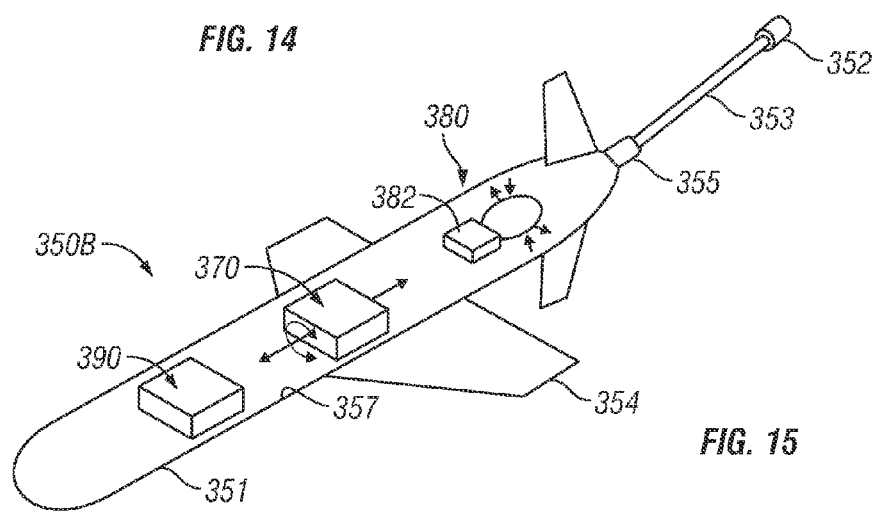
FIG. 15 illustrate inner details and components of the device of FIG. 14.

FIG. 15 illustrates another deployed device or vehicle 350B and reveals some inner details and components. On the vehicle 350B, the fins 354 are not movable, and the vehicle 350B does not use propulsion. Instead, the vehicle 350B uses buoyancy control having a volume (e.g., bladder) 380 in a free-flooded tail of the vehicle 350B. The volume of this bladder 380 can be adjusted using a pumping system 382 or the like so that the buoyancy of the vehicle 350B can be altered in a controlled manner.

To change the pitch and roll of the vehicle 350B, a mass 370 can be shifted axially along the length of the vehicle 350B or rotated about an axis. Preferably, the mass 370 is the actual battery used for the vehicle's electronic components, which include servos or other motors for moving the mass 370.

In contrast to the GPS receiver of FIG. 14, the GPS receiver 352 shown in FIG. 15 is located on the end of an extended arm or mast 353. This arm 353 can extend upward at an angle from the vehicle 350B so that the GPS receiver 352 can extend from out of the water when the vehicle 350B glides near the surface. Alternatively, the mast 353 can be pivoted at its base 355 from a streamlined position in line with the vehicle 350B to an upward angled position. When the vehicle 350B is periodically brought to the surface to obtain GPS data, the mast 353 can be activated to pivot the GPS receiver 352 out of the water at this base 355.

In general, the vehicle 350B can have features similar to those used for vehicles and drifting profilers that measure subsurface currents, temperatures, and the like in the oceans. As such, the vehicle 350B has a chassis (not shown) holding the variable buoyancy system 380, mass 370, and electronics section 390. An isopycnal hull 357 suitable for the density of seawater can fit in sections on the chassis. The hull 357 and chassis can then fit within a fiberglass housing 351 having the fins 354 and streamlined shape. The mast 353 for the GPS receiver 352 can connect to the electronics section 390 and can extend from the housing 351.

3. Brake for Deployed Device

As previously illustrated in FIG. 12B, for example, the streamer 60 is held below the surface of the water using the ice skeg 50 and other features disclosed herein. Steaming at a depth, the streamer 60 is free of any surface tensions and other conditions at the water's surface that may produce significant drag on the streamer 60. Therefore, if the towing vessel 30 encounters large ice, obstructions, engine failures, or other problems and either slows or stops towing, the streamer 60 may tend to glide under the water toward the stern of the vessel 30. Usually, the towing vessel 30 has redundant systems (engines, etc.) to prevent stops. In icy waters, however, the vessel 30 running through ice floes can encounter any number of obstacles that slow or stop the vessel 30, regardless of these redundancies.

Figure 16A:
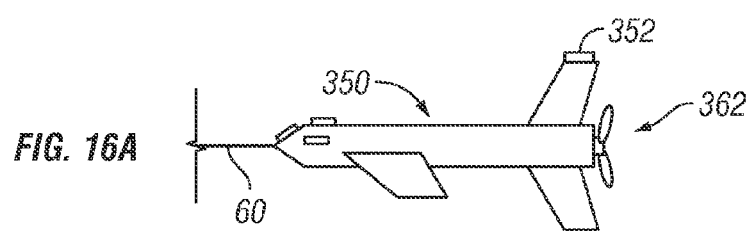
FIG. 16A illustrates a first brake for a controllable device.

If the gliding of the streamer 60 is left unhindered, the streamer 60 can collapse on itself, become entangled with other streamers 60, or even get caught in the propeller of the vessel 30. To mitigate this issue, the deployed device or vehicle 350 on the streamer 60 can use a brake mechanism to increase drag of the steamer 60 or apply reverse propulsion to the steamer's movement. The particular brake shown on the vehicle 350 in FIG. 16A uses a propeller 362. When left free spinning, the propeller 362 may spin and not produce significant drag to reduce the glide of the vehicle 350. Once activated if the vessel slows or stops, then torque can be applied to the propeller 362 to hinder its spin and to produce drag that reduces the glide of the vehicle 350. Alternatively, an internal motor in the vehicle 350 may turn the propeller to apply reverse propulsion.

Figure 16B:
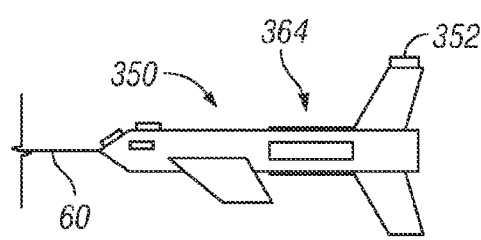
FIGS. 16B-16C show a second brake for a controllable device in an undeployed and deployed condition.
Figure 16C:
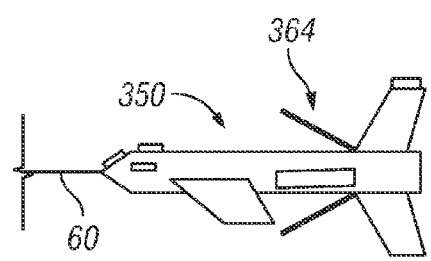

Another brake in FIGS. 16B-16C has expandable fins 364. Shown undeployed in FIG. 16B, the fins 364 fit against the side of the vehicle 350 allowing it to glide through the water. When activated due to slowing/stopping of the vessel 30, then the fins 364 deploy outward from the vehicle 350 as shown in FIG. 16C to slow the forward glide of the vehicle 350. The activation of the fins 364 as well as the other brakes disclosed herein can be controlled by the control system (not shown) on the vessel communicating with the vehicle 350 using the streamer 60.

Figure 17A:
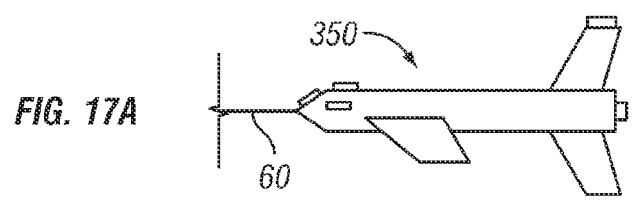
FIGS. 17A-17C show a third brake for a controllable device in an undeployed, deployed, and released condition.
Figure 17B:
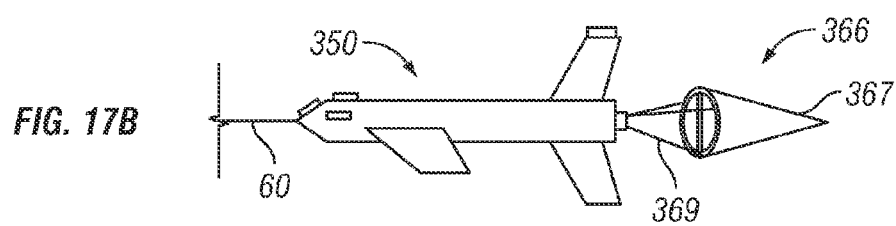
Figure 17C:
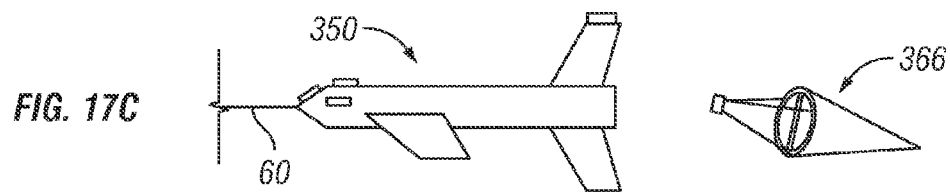

FIGS. 17A-17C show a third brake for the vehicle 350 in an undeployed, deployed, and released condition. This form of brake uses a deployable drogue 366. Initially, the drogue 366 remains undeployed as shown in FIG. 17A, while the vehicle 350 is allowed to glide with the streamer 60. The drogue 366, for example, can be housed in the end of the vehicle 350. When the vessel 30 slows or stops, then the drogue 366 is deployed from the end of the vehicle 350 as shown in FIG. 17B to slow the forward glide of the vehicle 350 and streamer 60.

Once deployed, the drogue 366 opens and trails behind the vehicle 350 to provide resistance when pulled through the water. In general, the drogue 366 may take the form a parachute or cone 367 and can be held by tether lines 369. Depending on the loads, the drogue 366 may have holes or openings to allow some flow therethrough. Once slowing of the vehicle 350 is no longer needed, the drogue 366 can be released as shown in FIG. 17C.

In one arrangement, the vehicle 350 may only have one such deployable drogue 366. Once deployed to prevent the streamer 60 from moving forward when the vessel slows or stops, the drogue 366 can be released to allow the vehicle 350 to function normally. However, the vehicle 350 may not be able to prevent another instance of slowing or stopping. Therefore, in other arrangements, the vehicle 350 can have multiple deployable drogues 366 that can be automatically deployed when needed and then released after use so that another such drogue 366 can then be used later if needed.

Other forms of brakes could also be used on the vehicle 350 to slow its forward movement in the event the attached streamer 60 moves forward towards the vessel. For example, the brake 360 can include expanding fins, umbrella structures, parachutes, and the like. These brake features can be extended or deployed from the vehicle 350 when triggered to stop the forward movement of the vehicle 350 and attached streamer 60.

F. Additional Arrangements to Handle Steamers Relative to Vessel

Embodiments of brakes for deployed devices have been discussed above. In addition to these embodiment, other arrangements can be used with the disclosed system to handle gliding of the streamers 60 to the vessel when slowed or stopped abruptly.

In FIG. 18A, a tow vessel 30 tows a streamer 60, and a drag producing apparatus 330 having a drogue 332 or the like drags at the tail of the streamer 60. On the vessel 30, a tension device 342 monitors the tension of the lead-in streamer cable 65 using techniques known in the art. Although the tension depends on the circumstances, it can be sensed directly with an appropriate device, or it can be mathematically calculated based on the tow speed, the length of the streamer, the diameter of the streamer, and the amount of drag produced, as well as other factors.

Regardless of how obtained, the tension level is fed to a controller 340 coupled to a reel 344 for the streamer 60. If the tension is lost due to the vessel 30 having to slow or stop, then the controller 340 activates the reel 344 to bring in the streamer 60 automatically at a speed that can maintain the needed tension and keep the streamer 60 from going under the vessel 30. An alarm can be sounded on the vessel 30 so that operators can prepare to remove the devices mounted on the streamer 60 if they must be brought on board quickly.

To bring in the streamer 60, it may be necessary to first release the streamer cable 65 from the ice skeg 50 by releasing and detaching the bend limiter (not shown) discussed previously. Additionally, operators may need to detach any towlines (not shown) connected between the skeg 50 and the cable 65.

In FIG. 18B, a tow vessel 30 tows a streamer 60, and a drag producing apparatus 330 having a drogue 332 or the like drags at the tail of the streamer 60. On the vessel 30, a controller 336 uses a tension monitor (not shown) or calculations to monitor the tension of the lead-in streamer cable 65 using techniques known in the art.

If the vessel 30 has to slow or stop, then the controller 336 activates a reverse propulsion device 334 towed at the end of the streamer 60. Similar to previous discussions, this reverse propulsion device 334 can include a propeller and a motor, turbine, or the like. Once activated, the device 334 creates reverse propulsion that slows the forward movement of the streamer 60 or at least reduces its rate. Depending on the implementation's details, such as the weight of the streamer 60, the tow speed, and other factors, the reverse propulsion required by the device 334 may need to be as high as 75 hp.

G. Deployment Arrangements for Systems

Because the towing vessel 30 tows the seismic array in icy waters, deployment of the seismic survey components preferably accounts for possible issues with ice floes and the like that can hinder the deployment and retrieval of the streamers 60 and sources 90. As noted previously (specifically with reference to FIGS. 4A-4C), deployment and retrieval of the system may be performed when the towing vessel 30 is away from significant ice. For example, the seismic system can be deployed normally before putting cables into the skeg 50 and submerging the various components.

In a typical implementation, the streamers 60 can be several kilometers in length, and deploying the seismic system in a clearing may require a significant area that may not always be available in icy regions. Therefore, it is desirable to be able to deploy/retrieve the disclosed seismic systems in other areas of an icy region, including those having ice.

Figure 19A:
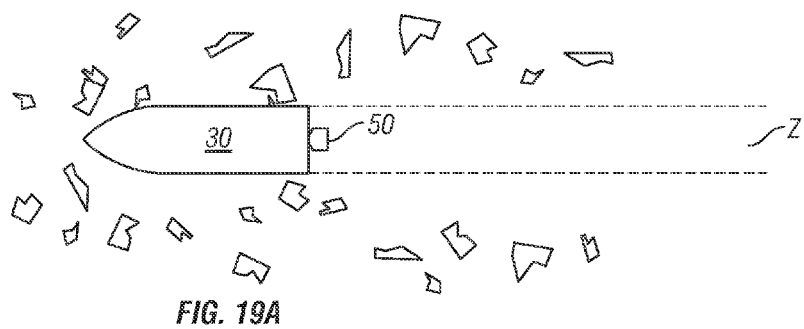
FIG. 19A shows a plan view of a seismic vessel with an ice skeg and a deployment zone behind a vessel.

For reference, FIG. 19A shows a tow vessel 30 traveling through an icy region that is not entirely clear of ice. The vessel 30 has an ice skeg 50 from which one or more sources and streamers can be towed. The vessel 30 may break the ice and/or push ice floes out of the way as it travels so that a narrow deployment area Z lies in its wake where ice may be relatively absent. Of course, this depends on how tightly the ice is packed and how it might be traveling.

When conditions permit, it is preferred to be able to deploy and retrieve the streamers 60 of an array in such a cleared area Z. Therefore, the deployment and retrieval techniques for surveying in icy waters preferably take advantage of this potentially cleared area Z. The examples below discuss several forms of seismic arrays that can be deployed and retrieved in such an area Z.

Figure 19B:
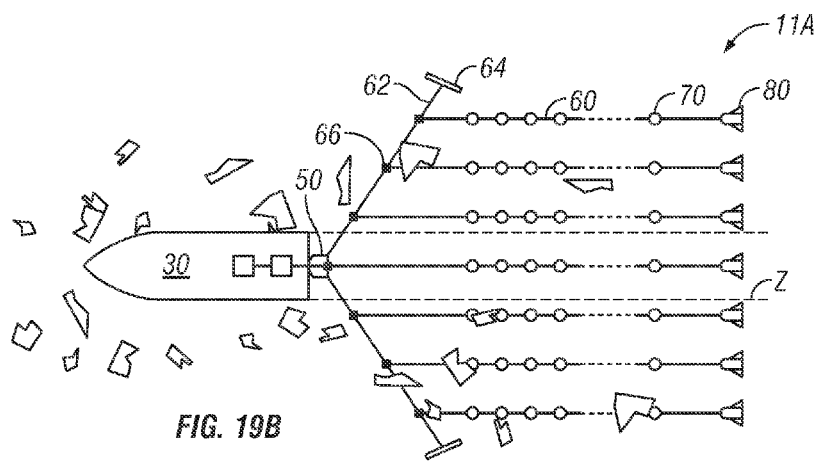
FIGS. 19B-19E shows the seismic vessel with various forms of seismic arrays deployed.

In FIG. 19B, a first form of seismic array 11A uses direct towlines 62 from the skeg 50. These lines 62 are deployed with paravanes 64 on the end. Then, steamers 60 having sensors 70 and deployed devices 80 can be deployed in the water in the cleared area Z and then coupled to the direct towlines 62 using a coupling 66, such as a ball joint. This arrangement can allow several streamers 60 to be deployed separately in the shadow of the vessel 30 and individually coupled to the towlines 62.

Figure 9C:
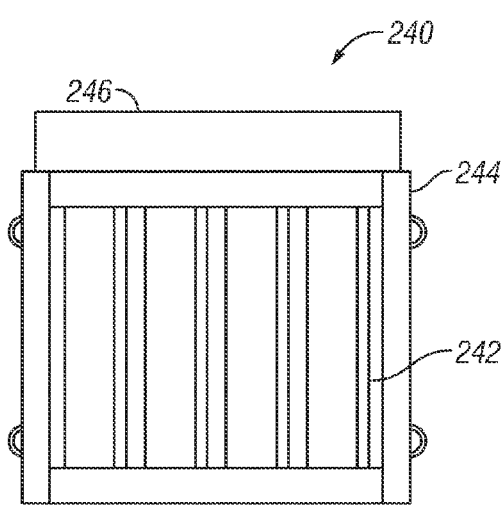
FIGS. 9C-9D show a buoyant vane for the disclosed system.

For reference, FIG. 9C shows an example of a paravane 240 that can be used with the disclosed system. This paravane 240 has a frame 244 holding one or more louvers or vanes 242 intended to engage the water when towed therein. Because the paravane 240 support streamers (60) towed below the surface of the water, the paravane 240 is preferably neutrally buoyant. Accordingly, the paravane 240 can have a buoyancy element or float 246 disposed thereon or connected thereto that is intended to make the paravane 240 neutrally buoyant at a predetermined depth. This buoyancy element 246 may be filled with a foam or the like, or it may contain a fillable volume (e.g., bladder or chamber) as disclosed herein to configure its buoyancy. Additionally, the paravane 240 may have controllable wings (not shown) as disclosed elsewhere herein to control the depth of the paravane 240 when being towed.

Figure 9D:
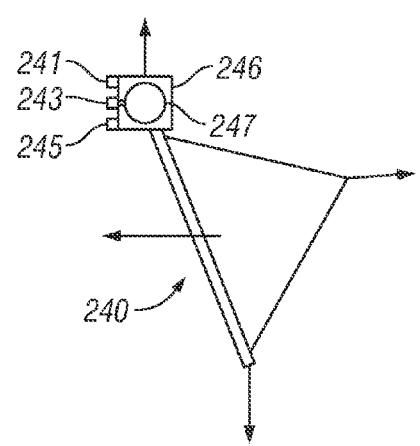

In FIG. 9D, the dynamics of a paravane 240 having a buoyancy element 246 are diagrammatically illustrated. As expected, the paravane 240 acts as a wing or door in the water. Gravity acts to pull the paravane 240 to greater depths, the passing water acts against the surface of the paravane 240, and the towlines pull the paravane 240 against the water. Finally, the buoyancy element 246 acts to maintain the paravane 240 at a desired depth in the water. At the same time, the arrangement of the paravane's geometry and the applicable forces must be handled so that the paravane 240 remains stable in the water when being towed and does not twist and turn due to torque.

To maintain depth and stability, the buoyancy element 246 can include a depth sensor 241, a controller 245, and a buoyancy chamber 247. In response to changes in the depth beyond a desired level detected by the depth sensor 241, the controller 245 can adjust the buoyancy of the chamber 247 to alter the paravane's depth. For example, the controller 245 can operate a valve or pump 243 and can flood or evacuate water in the chamber 247 filled with air.

Figure 19C:
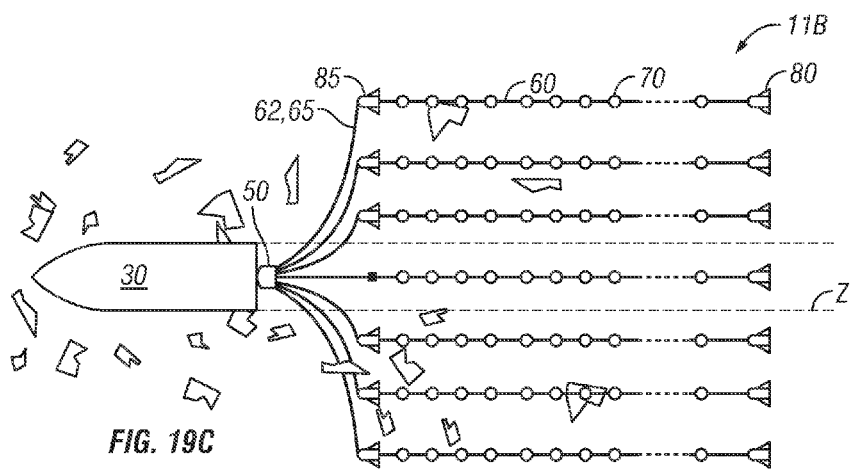

In FIG. 19C, a second form of seismic array 11B uses multiple controllable vehicles 80/85 and streamers 60 with sensors 70. To achieve three-dimensional operation, each of the leading vehicles 85 individually tows a streamer 60. Towlines and streamer cables 65 connect the leading vehicles 85 to the vessel 30. The position and depth of each vehicle 80/85 is controlled to maintain an appropriately arranged array of streamers 60 for the seismic survey. In addition, the controlled depth allows the streamers 60 to avoid any ice floes at the surface. In general, each vehicle 80/85 can be an autonomous underwater vehicles (AUVs), a remotely operated vehicle (ROV), a remotely operated towed vehicle (ROTV), or some other suitable vehicle depending on the implementation. If the leading vehicles 85 are strictly autonomous underwater vehicles (AUVs), then they may not be attached to the vessel 30 by a towline or tether.

Being independent of one another, the vehicles 85 also facilitate deployment and retrieval of the streamers 60 during operation. For example, an individual vehicle 85 can guide its streamer 60 down under the other streamers 60 and can bring it up through the middle of the array of streamers 60 in the potentially cleared area Z. The vehicle 85 can then pull its steamer 60 up to the vessel 30 and avoid the other streamers 60 and towlines and cables 62/65. This will allow operators to deploy and retrieve the streamers 60 individually and can even allow for repair of a steamer 60 while all of the other streamers 60 remain in the water. Using the vehicles 85 is also beneficial in icy waters, because the vehicles 85 allow the towlines 62 to be less taut than conventionally done, and the less taut lines 62 in the icy waters are better suited to handle potential impacts with ice during operation.

Figure 19D:
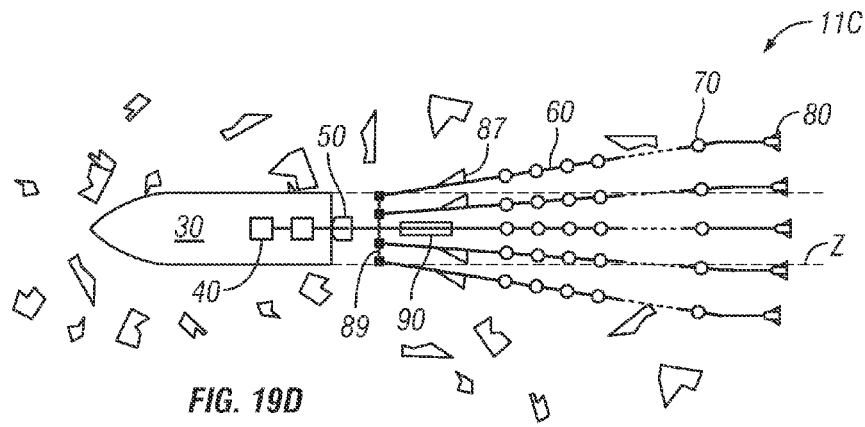
Figure 19E:
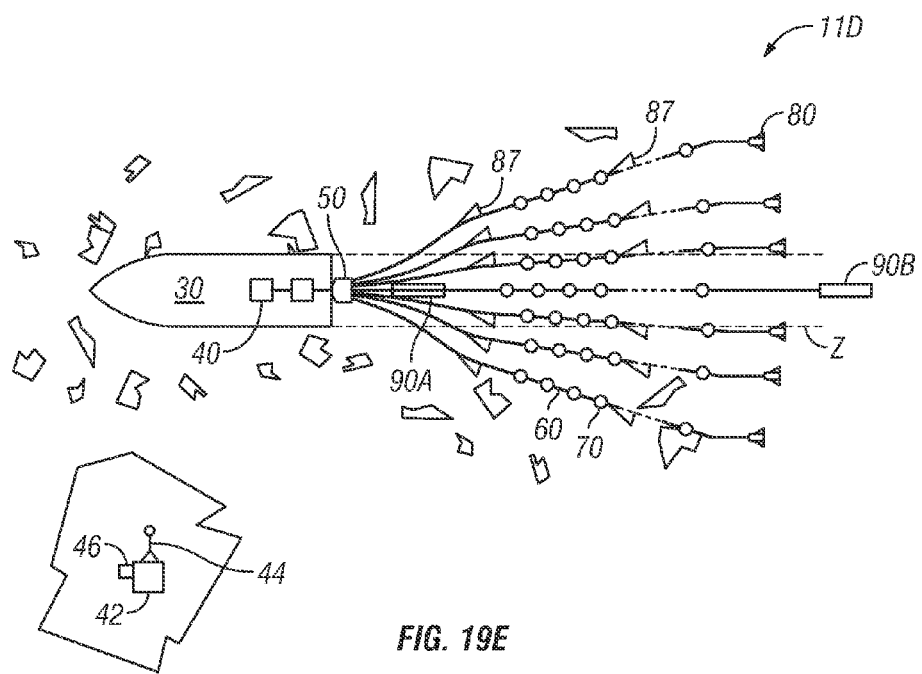

FIGS. 19D and 19E show additional forms of seismic arrays 11C and 11D that use a splayed arrangement of the streamers 60. In FIG. 19D, a cross arm 89 is deployed underwater from the skeg 50 in the shadow of the vessel 30, and several streamers 60 couple to the cross arm 89 using appropriate couplings. These steamers 60 can then splay outward from the cross arm 89 using one or more controllable fins or wings 87 disposed along their length.

In FIG. 19E, each of the streamers 60 deploy individually from the skeg 50 so that they deploy underwater and in the shadow of the vessel 30. As before, these streamers 60 can splay outward from the skeg 50 using one or more controllable fins or wings 87 disposed along their length.

Figure 9E:
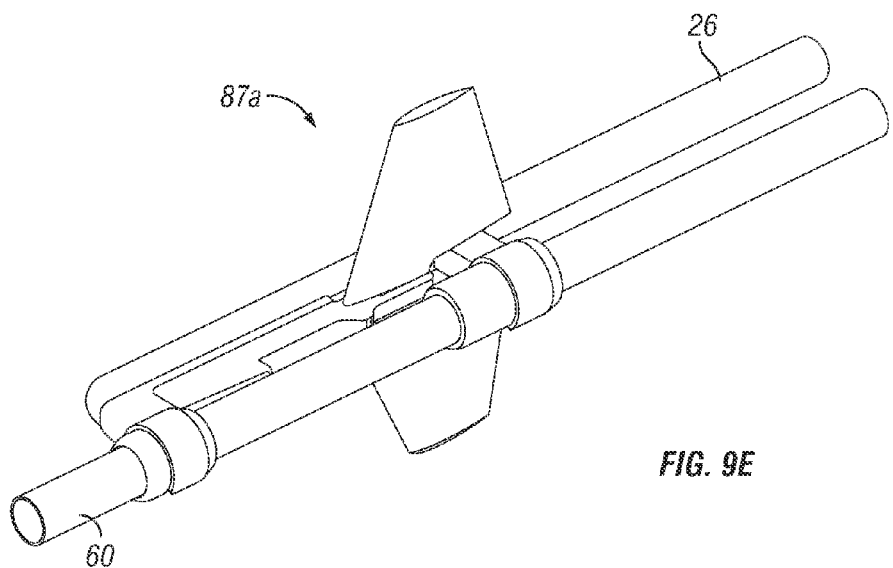
FIG. 9E shows a perspective view of a controllable fin for a streamer.
Figure 9F:
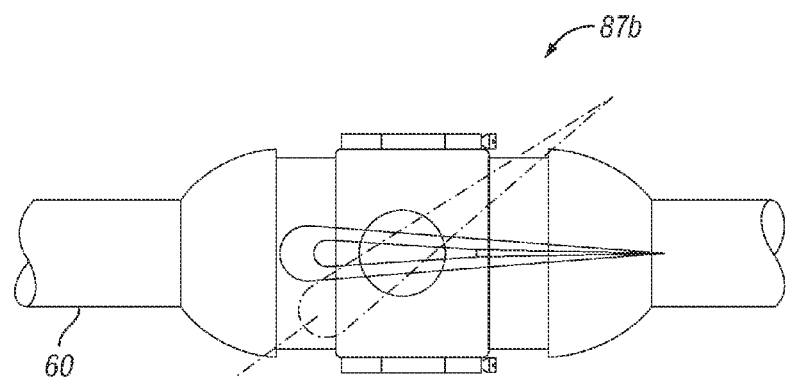
FIG. 9F shows a side view of a controllable wing for a streamer.

For reference, FIG. 9E shows a perspective view of a controllable fin 87a that can be used to steer a streamer 60 (i.e., control the lateral position of the streamer 60). In addition, FIG. 9F shows a side view of a controllable wing 87b that can be used to control the depth (i.e., vertical position) of a streamer 60. Details of such devices having fins or wings deployable on a cable for controlling the lateral or vertical position of a streamer cable can be found in U.S. Pat. Nos. 6,525,992; 7,092,315; 7,206,254; and 7,423,929, which are each incorporated herein by reference.

For example, these controllable fins or wings 87 in the systems of FIGS. 19D-19E can be DIGIFIN™ streamer steering systems available from ION Geophysical to steer the streamers. They can also be DIGIBIRD™ streamer steering systems available from ION Geophysical to control the depth of the towed streamers. (DIGIBIRD is registered trademarks of ION Geophysical Corporation.)

Control of the fins or wings 87 and determination of the location of the sensors 70 can be performed using the control system 40 and available software. Other devices that can also be used include the Compass Bird streamer systems available from ION Geophysical for providing compass heading information and depth measurement and control. Moreover, the control system 40 and available software can control the various fins and wings 87 to avoid ice bergs or large chunks of ice that may happen to travel at the surface over the array of streamers 60 and potentially has a depth sufficient to damage the submerged streamers 60.

Although one skeg 50 is shown in the arrangements of FIGS. 19A-19E, it is possible for a vessel to use multiple skegs 50 on the vessel 30 to deploy streamers 60. Using the multiple skegs 50 can help in the deployment and retrieval of the streamers 60 by dividing them up in their arrangement.

Although the arrangements in FIGS. 19B-19D and elsewhere show a single source, multiple sources could be used. For example, FIG. 19E shows one source 90A in a conventional location towed behind the vessel 30. In addition, another source 90B is towed behind the splayed array of the steamers 60. This second source 90B can be used to obtain a reverse reading from the steamers 60, which can be advantageous for data acquisition and analysis.

H. Control and Position System

The systems in FIGS. 19A-19E and those disclosed elsewhere herein use a control system 40 that can use conventional features for marine seismic surveying. For example, the control system 40 can control lateral steering of the streamers 60 using streamer technology currently available for conventional marine seismic surveying in non-icy waters. For icy regions, the control system 40 can be integrated with additional features for handling information related to icy waters. For example, the control system 40 can be integrated with information from satellite imagery, nautical charts, weather forecasting, and other information to predict thickness of ice for a survey region and to find clearings in the ice in given areas.

Satellite images can be limited, and ice floes and locations of ice bergs, chunks, and other obstructions can change over time. Therefore, it would be helpful to keep track of the position of particular obstructions and determine how they are moving and how their movements may hinder the survey being conducted. Accordingly, the control system 40 can also use separate position sensors that are placed on ice bergs or other floating obstructions that could threaten the steamer array during the seismic survey.

As shown for example in FIG. 19E, the positions sensors 42 can be battery operated and can have a GPS receiver 44 and a communication interface 46. When located on an obstruction, the position sensor 42 can broadcast information about its location. For example, as the ice breaker vessel (not shown) breaks ice ahead of the surveying vessel 30, operators may place these separate position sensors 42 on particularly large or deep ice chunks or bergs. Then, using an appropriate communication link with the separate position sensor 42, the control system 40 can track the movements of the obstruction.

Its movement may be immediately tracked to determine if it will interfere with the array of streamers 60 currently being towed by the seismic vessel 30. If that is the case, the streamers 60 can be steered away or to a greater depth for protection. In addition, the movement of the obstructions can be tracked over time so the control system 40 can know the location of the obstructions when the streamers 60 are towed back over the area when mapping. Depending on whether the obstruction has moved into the proposed path of the survey, operators can alter the course of the seismic vessel 30 to avoid the obstruction's known position.

1. System Using Controllable Deployed Devices

As noted previously, the controllable deployed devices 80 can be used on the tail end of the steamers 60 to control position of the streamers 60. As also noted previously, the devices 80 can include Remotely Operated Towed Vehicles (ROTVs) that lack a propulsion system but have controllable fins. FIG. 20A illustrates a side view of a marine seismic survey system 12A having a Remotely Operated Towed Vehicle (ROTV) 400 as the controllable device at the tail end of the streamers 60. The ROTV 400 is towed on the end of the streamer 60 below the surface of the water. This ROTV 400 also has a GPS receiver 412 that can obtain GPS readings once the ROTV 400 is brought to the surface.

FIG. 20B illustrates a plan view of another marine seismic survey system 12B having ROTVs 400 at multiple locations on the streamers 60. In this system, leading ROTVs 400A are towed at the head of the streamers 60, and trailing ROTVs 400B are towed on the end of the streamers 60. The leading ROTVs 400A connect by towlines 62 and streamer cables 65 off the vessel's skeg 50. If desired, even intermediate ROTVs (not shown) may be deployed at intermediate locations along the streamers 60.

To achieve three-dimensional (or even 2-D or 4-D) operation, each of the leading ROTVs 400A individually tows a streamer 60. Towlines and streamer cables 62/65 connect the ROTVs 400A to the vessel's skeg 50. During surveying, the position and depth of each ROTV 400A-B can be controlled to maintain an appropriately arranged array of streamers 60 for the seismic survey. In addition, the controlled depth allows the streamers 60 to avoid any ice floes at the surface.

Using the ROTVs 400A-B in leading and tailing locations along the streamers 60 can facilitate deployment and retrieval of the streamers 60. Being independent of one another, for example, individual ROTVs 400A-B can guide their streamer 60 down under the other streamers 60 and can bring it up through the middle of the array of streamers 60 in the potentially cleared area behind the vessel 30. The steamer 60 can then be pulled up to the vessel 30 and avoid the other streamers 60 and towlines 62. This will allow operators to deploy and retrieve the streamers 60 individually and can even allow for repair of a steamer 60 while all of the other streamers 60 remain in the water. Use of a single ROTV 400 on the tail of the streamer 60 as in the system of FIG. 20A may also be capable of the same form of deployment and retrieval.

2. Details of ROTV

Figure 21A:
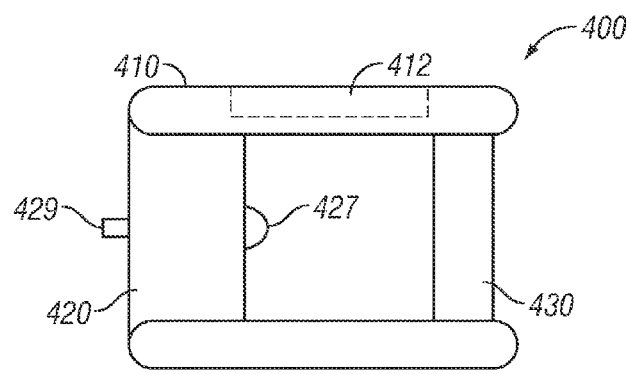
FIGS. 21A-21B shows a Remotely Operated Towed Vehicle (ROTV) in more detail.
Figure 21B:
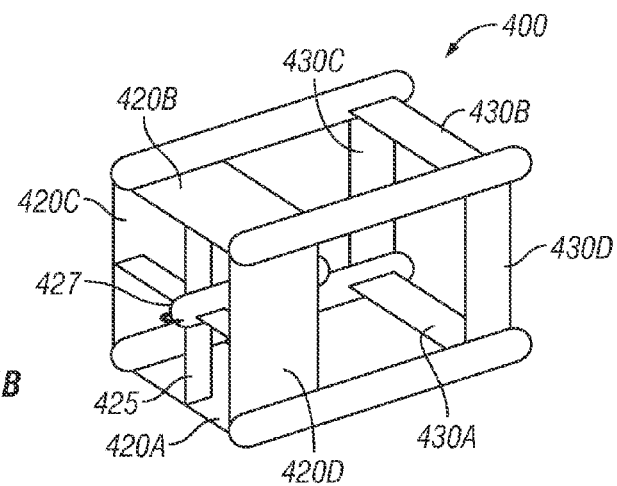

FIGS. 21A-21B show one embodiment of a Remotely Operated Towed Vehicle (ROTV) 400 in more detail. In general, this ROTV 400 is a hybrid type of device incorporating elements of ROVs, AUVs, and gliders. One suitable example for the ROTV 400 is a TRIAXUS Towed Undulator available from MacArtney Underwater Technology Group.

For towing the ROTV 400, a tow cable (not shown) having power conductors and communication lines connects to the leading edge 49 of a center foil 427. As shown, the ROTV 400 has four tubulars 410 interconnected in their front section by foils 420/425 and in their trailing section by flaps 430. The foils 420/425 and flaps 430 have a wing shape. Central foils 425 interconnect the leading foils 420 and support the horizontal foil 427 in the front of the ROTV 400. These central foils 425 help keep the ROTV 400 leveled in its roll direction. The trailing flaps 430 are controllable with the upper and lower flaps 430A-B controlling pitch and the right and left flaps 430C-D controlling yaw.

Four actuators or motors (not shown) installed in each of the tubulars 410 move these flaps 430A-D to control the pitch and yaw of the ROTV 400 as it is towed. The tubulars 410 have compartments 412 for holding various components besides the motors, gears, and position sensors for the flaps 430A-D. For example, these compartments 412 can have a GPS receiver, an inertial navigation system, a depth sensor, a pitch sensor, a roll sensor, a heading sensor, etc., discussed below.

While being towed, the horizontal flaps 430A-B produce up and down forces to move the ROTV 400 vertically, while the vertical flaps 430C-D produces starboard and ports force in order to move the ROTV 400 horizontally (laterally). Typically, the ROTV 400 will be towed in a neutral position with the flaps 430 being adjusted intermittently to maintain the ROTV 400 as is. Some situations, such as rising to the surface, will require more aggressive movement of the flaps, especially when connected to a streamer. Braking for the ROTV 400 can use some of the techniques discussed previously. Additionally or in the alternative, the flaps 430 can be turned inward or outward to increase the ROTV's drag while being towed.

3. Control System for ROW, INS, and GPS

Figure 22:
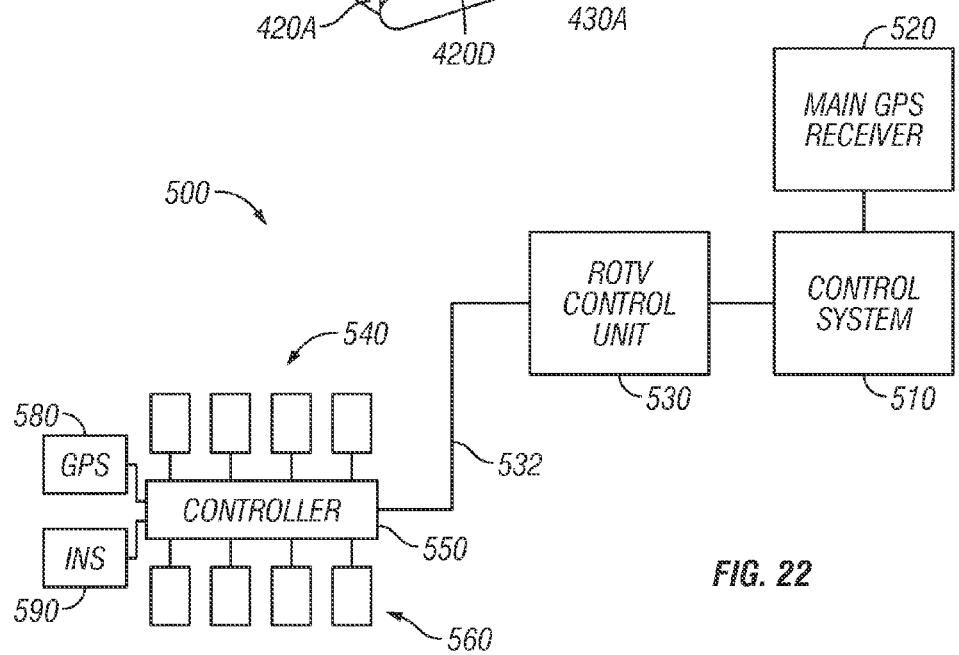
FIG. 22 schematically illustrates a control system for controlling the ROTVs and dead reckoning its location while being towed.

FIG. 22 schematically illustrates elements of a control system 500 for controlling controllable vehicles (e.g., ROTVs 400) and determining their locations while being towed in a marine seismic system of the present disclosure. As noted previously, the main control system 510 on the towing vessel has a main GPS receiver 520 for obtaining GPS readings. As before, this control system 510 can be an instrumentation control system such as Orca® available from ION Geophysical. The control system 510 interfaces with (or is integrated with) a control unit 530, which controls and monitors the various vehicles (e.g., ROTVs) used for the streamers in the array. An example of a suitable control unit 530 for an ROTV 400 of FIGS. 21A-21B is the topside unit used for the TRIAXUS ROTV.

Connected by communication and power lines 532, the control unit 530 interfaces with a local controller 550 on a controllable vehicle 540, which can be an ROTV 400 of FIGS. 21A-21B. The controller 550 communicates sensor data from the device's sensors 560 to the control unit 530. After interfacing with the navigational information in the main control system 510, the control unit 530 sends navigational instructions back to the controller 550, which operates the various fin motors 570 appropriately. Navigating the controllable vehicle 540 can involve both real-time control and preprogrammed trajectories.

The controller 550 communicates with the device's integrated sensors 560 and to the motors 570 for the flaps. The integrated sensors 560 for controlling the device 540 include a depth sensor, a pitch sensor, a roll sensor, and a heading sensor. The depth can be measured with a pressure sensor, while pitch and roll can be measure by bi-axial inclinometers. The yaw or heading can be measured using a fluxgate compass, and an altimeter can also be used.

In addition to the integrated sensors 560, the controller 550 can connect to position sensors that monitor the motors and flaps to keep track of the positions of these flaps to feedback to the control unit 530. All of these integrated sensors (i.e., pitch, roll, heading, and motor position) provide feedback for the control system 510 to control the flaps to direct the controllable vehicle 540 and keep it from rolling.

Aside from these sensors, the controller 550 on the controllable vehicle 540 communicates with a GPS receiver 580. As noted previously, when the controllable vehicle 540 is brought to the surface, the antenna for the GPS receiver 580 can be exposed above the water's surface to obtain GPS readings. Yet, such readings are expected to be intermittently made. Likely, when used in icy or obstructed waters, the controllable vehicle 540 may be towed under ice floes for several continuous hours or even days before it can be resurfaced to obtain GPS readings. Therefore, the controllable vehicle 540 also has an Inertial Navigation System (INS) device 590 used for determining the location of the controllable vehicle 540 between direct GPS readings with the GPS receiver 580.

In general, the INS device 590 can uses components known in the art, such as a processor, accelerometers, and gyroscopes. The INS device 590 uses dead reckoning techniques to determine position, orientation, direction, and speed of the controllable vehicle 540 continuously. Depending on how long the controllable vehicle 540 must be dead reckoned in this way, the drift error inherent to the INS device 590's measurement of acceleration and angular velocity becomes increasingly magnified. Accordingly, the navigation is preferably corrected by periodic GPS readings. Even with an error of a fraction of a nautical mile per hour for position and tenths of a degree per hour for orientation, error in the INS device 590's determination can be significant if the controllable vehicle 540 must remain below the surface for extended periods. Discussion below describes a feedback loop that can be used to correct the INS device 590's determination.

4. Control Loop

Figure 23:
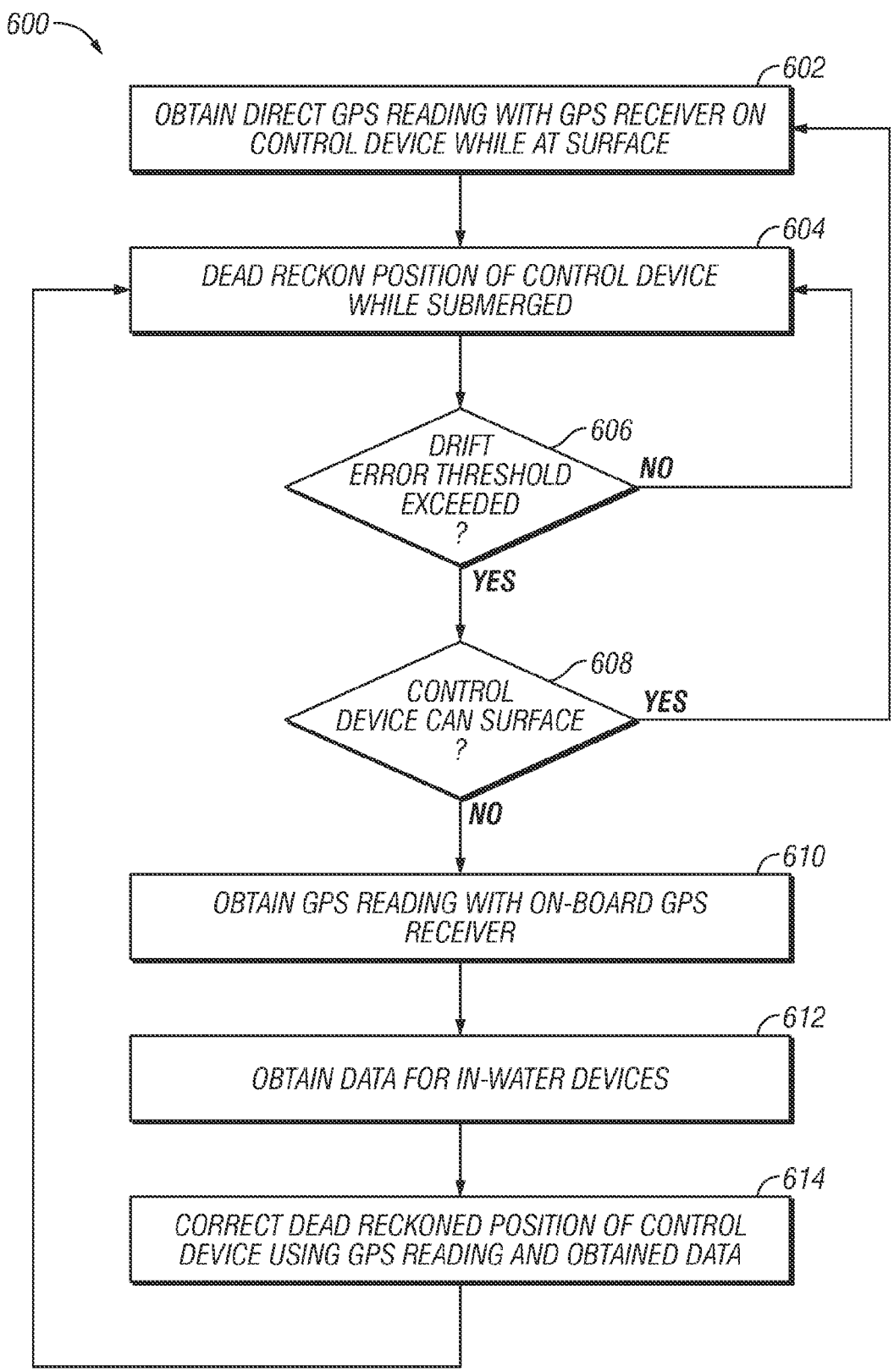
FIG. 23 shows a control loop for dead reckoning and correcting drift in an Inertial Navigation System.

FIG. 23 shows an example of a navigational feedback loop 600 for determining the position of a controllable vehicle (e.g., 540; FIG. 22), such as an ROTV, and correcting that position. Initially in the loop 600, the controllable vehicle 540 obtains a direct GPS reading using its GPS receiver 580 (Block 602). This is done while the area above the controllable vehicle 540 is free of ice floes or other obstructions. After the controllable vehicle 540 submerges again, the INS device 590 and control system 510 begin determining the position of controllable vehicle 540 as it is towed (Block 604). This is done by taking the starting location or fix from the GPS reading and measuring direction, speed, and time to calculate the position of the controllable vehicle 540 going forward from that starting position using dead reckoning techniques.

Unfortunately, this form of inertial navigation is not precise and drift error accumulates over time. As long as the drift error is low enough, this inertial navigation can continue. At some point, the control system 510 determines whether drift error has exceeded some acceptable range that depends on the implementation (Block 606). If not, then the control system 510 can continue dead reckoning (Block 604) until the drift error is too large.

Once the drift error is large (due to a long period of dead reckoning, fast survey speeds, long survey distance, or a combination of the these), the control system 510 seeks to correct the error by either resurfacing the controllable vehicle 540 to obtain a new GPS reading that fixes the device 540's position or by integrating the INS device's dead reckoning with feedback from the vessel's main navigation system. Accordingly, the control system 510 determines from manual input or from the sensors (sonar, ice profiler, fathometer, etc.) on the controllable vehicle 540 whether the device 540 can rise to the surface (Decision 608) to obtain another GPS reading to fix the device's location (Block 602) to repeat the process.

If the controllable vehicle 540 cannot surface, then the control system 510 obtains a GPS reading using the on-board GPS receiver 580 of the vessel (Block 610). This GPS reading gives the location of the tow vessel. As an additional supplement, the system 510 obtains data from the various in-water devices (i.e., controllable vehicle 540, streamer, sensors, etc.) (Block 612). This data can be used to determine the relative position of the controllable vehicle 540.

Figure 24:
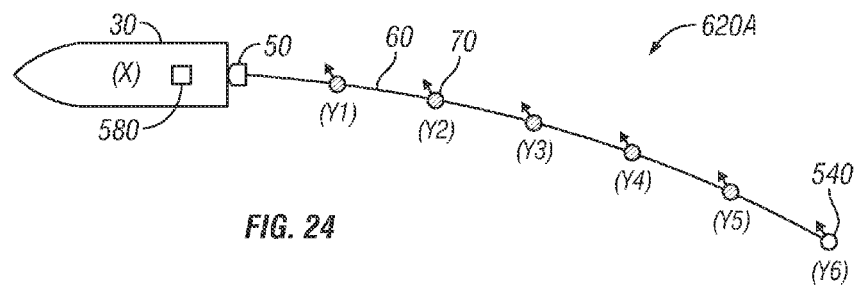
FIG. 24 shows a steamer with sensors positioned thereon for determining the shape of the streamer using a GPS reading for a vessel, known sensor locations, a known controllable vehicle location, and various compass headings.

For example, FIG. 24 shows a system 620A having a steamer 60 with sensors 70 positioned thereon for determining the shape of the streamer using a GPS reading (x) for the vessel 30, known sensor locations (Y1-Y5), known controllable vehicle location (Y6) along the streamer 60, and various compass headings. As shown, data about the sensors 70 and controllable vehicle 540 on the streamer 60 (including each of their positions (Y) on the streamer 60, compass headings corrected by declination, and the like) can be used to estimate the location of points on the streamer 60 and derive the streamer's shape. Combined with the vessel's GPS reading (X) using the on-board GPS receiver 580, all of this data can be integrated with the position data from the INS device (590; FIG. 23) to correct its drift error.

Figure 25:
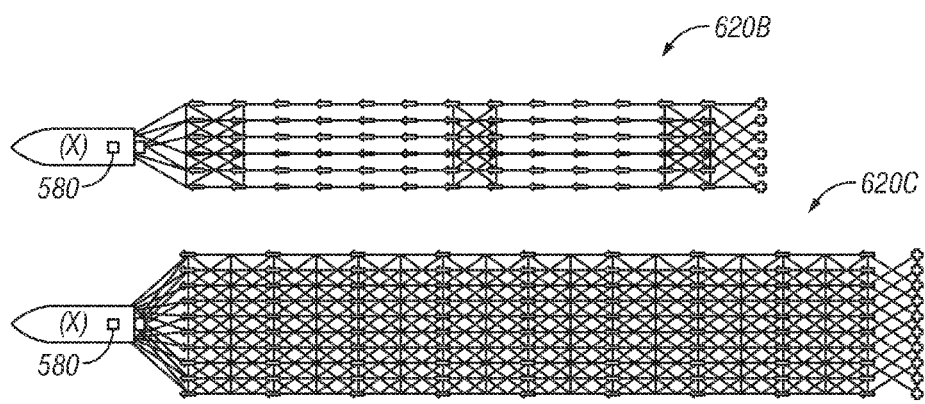
FIG. 25 shows different arrangements of acoustic systems for performing acoustic cross-bracing to determine streamers' positions.
Figure 26:
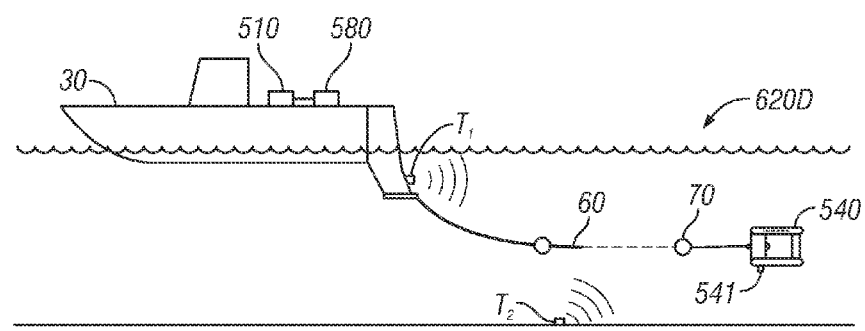
FIG. 26 shows how a short base line can be obtained using a transducer on a vessel and a sensor on a controllable device on the tail end of a streamer to determine its position.

Alternatively, acoustic positioning techniques can be used along with the GPS reading using the on-board GPS receiver 580 to correct drift error of the INS device. As shown in systems 620B-C of FIG. 25, for example, different arrangements of acoustic systems for performing acoustic cross-bracing are shown that can be used to determine the streamers' positions. Additionally, as shown in system 620D of FIG. 26, a short base line can be obtained by using a transducer $T_1$ on the vessel 30 to "ping" a sensor 541 on the controllable vehicle 540 toward the tail end of the streamer 60 to determine its position. Also, a long base line can be obtained by using one or more other transducers $T_2$ on the seabed (a minimum of two transducers are needed for a long base line system) to "ping" the sensor 541 on the controllable vehicle 540 to determine its position. Finally, even the control sensor readings from the controllable vehicle 540 and the movements directed to the controllable vehicle 540 by the control unit 530 can be integrated with the on-board GPS reading (X) to determine the position of the controllable vehicle 540. These and other techniques available in the art can be used.

Regardless of how the INS device's position is integrated with feedback from other navigation components, the control system 510 corrects the dead reckoned position of the controllable vehicle (See Block 614 in FIG. 23) so the system can continue using the INS device 590 with less drift error. The entire process of dead reckoning and correcting the drift error may continue as long as the controllable vehicle 540 remains submerged below the surface. Eventually, should conditions allow it, the controllable vehicle 540 is directed to the surface to obtain a direct GPS reading to fix its location (Block 602 in FIG. 23). This new GPS reading provides a new starting point for dead reckoning and correcting while the controllable vehicle 540 remains submerged in further surveying.

I. Handling Noise in Obstructed Waters

Figure 27:
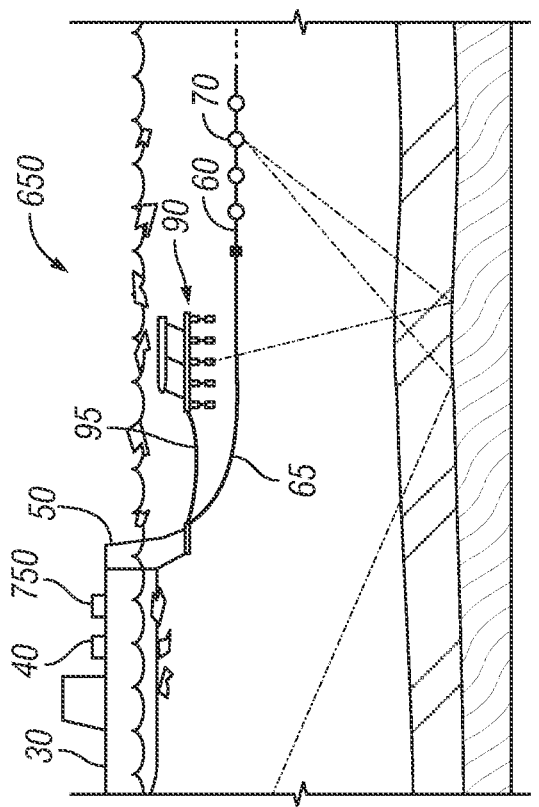
FIG. 27 is a side view of yet another marine seismic survey system according to certain teachings of the present disclosure that records ice impact events during operation.
Figure 27:
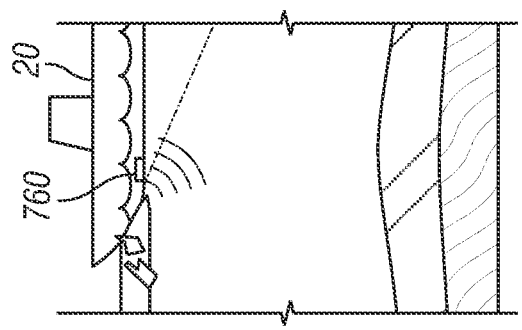

When surveying in obstructed waters and especially icy regions, impacts from the vessel can complicate the seismic data obtained. In FIG. 27, yet another marine seismic survey system 650 again has the ice skeg 50 and horizontal source 90 as before, although other components disclosed herein could be used. This system 650 records events as the ice breaking vessel 20 travels during the survey and breaks pack ice and impacts ice floes. Processing of resulting seismic data obtained with the sensors 70 can then use the recorded events, which include ice breaking and impacts. Briefly, the system 650 has a seismic recorder 750, which can include conventional hardware for recording marine seismic data obtained with the sensors 70 on the steamers 60. In addition, the system 650 has an ice impact recorder 760 on the hull of the ice breaker vessel 20, although one could also be included on the tow vessel 30.

Figure 28:
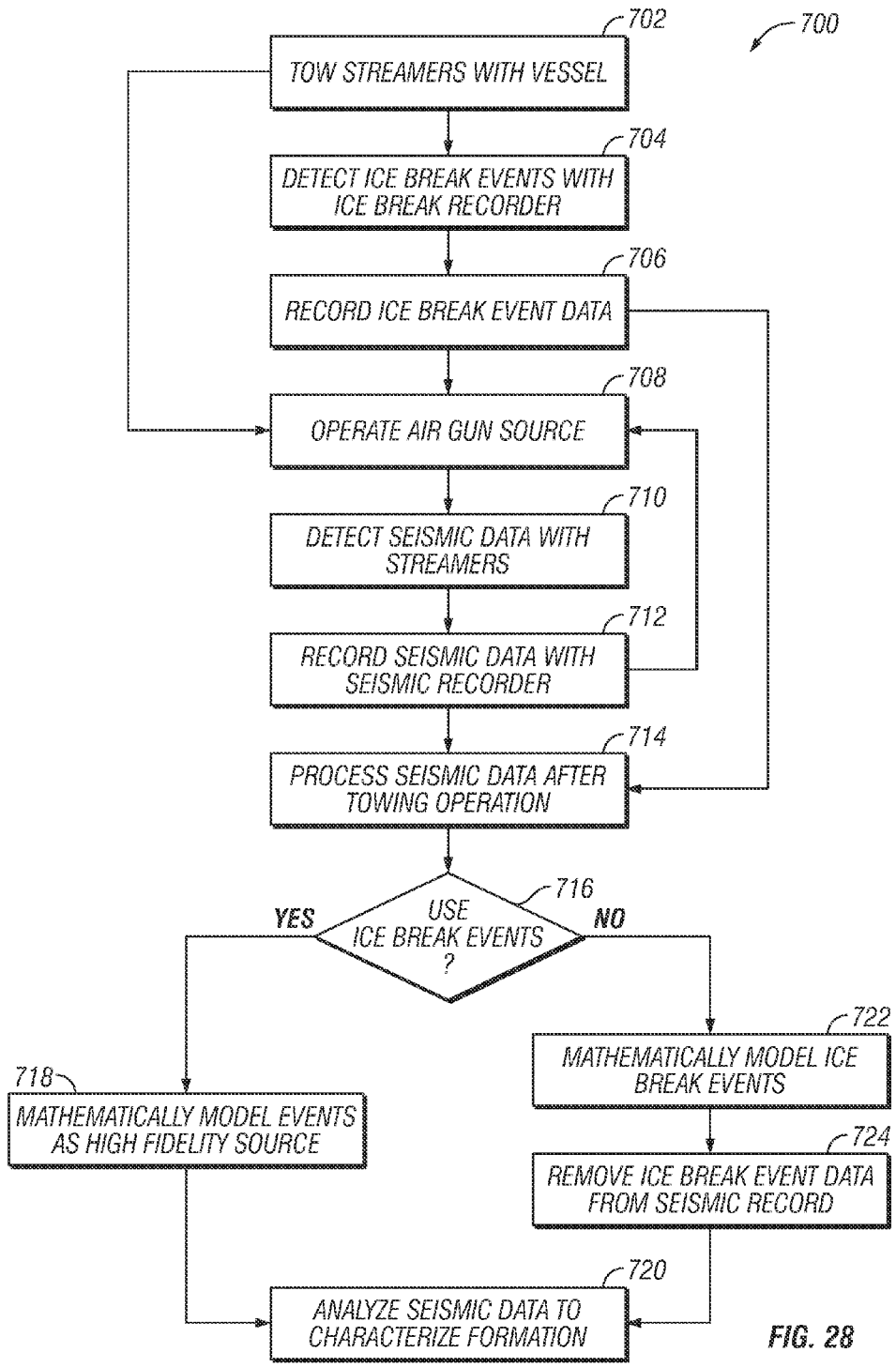
FIG. 28 shows a flowchart of a process for performing a marine seismic survey in an icy region when recording ice impact events.

Operation of the system 650 in FIG. 27 is discussed concurrently with reference to FIG. 28. In use, the system 650 obtains seismic data in an icy region and accounts for ice impact events that may occur while towing the streamers 60. As unusual, operators tow the streamers 60 having the sensors 70 with the tow vessel 30 (Block 702; FIG. 28). Ahead of the tow vessel 30, the ice breaking vessel 20 may break pack ice and divert ice floes to make a tract for passage of the tow vessel 30. Alternatively, the tow vessel 30 may be used alone and may break and divert ice on its own. In any event, the ice impact recorder 760 records ice impact events while the streamers 60 are being towed (Block 704). In response, the ice impact recorder 760 records information for the detected events for later analysis (Block 706). This is repeated throughout the towing operation.

As schematically shown in FIG. 29, the seismic recorder 750 has the sensors 70 run along the streamers, a GPS device 754, and a recording device 756. As it records seismic data, the recording device 756 also obtains location and time information from the GPS device 754 and records that information as part of the seismic record. How the seismic data is recorded and is stored can use conventional practices known in the art. Eventually, the seismic recorder 750 can be coupled to the control system (40), such as a computer system or the like, that can process and analyze the seismic record.

As schematically shown in FIG. 30, the ice impact recorder 760 has a sensor 762, a GPS device 764, and a recording device 766. The sensor 762 can use one or more accelerometers, inertial sensors, geophones, or the like that can at least detect the frequency and duration of impacts between the vessel's hull and ice. Accordingly, the sensor 762 is acoustically coupled to or mounted on the vessel's hull. For their part, the GPS device 764 and the recording device 766 can be conventional components. When recording impact events, the recording device 766 records a stream of data or discrete data points. As shown in the representative table 765 of FIG. 31, for example, the impact recorder (760) can record the time, the location (i.e., GPS coordinates), the frequency, and the duration for impact data points that occur during operation. This data is then stored for later use.

Packed ice when it is broken can produce a high fidelity source for the seismic survey. Each ice impact event will be different (i.e., have different signature) because of differences in the speed of the vessel, the thickness of the ice, etc. Yet, the impact recorder 760 can indicate when the ice is hit/broken, and recorded GPS data can indicate where and when the ice was broken relative to each of the seismic sensors (which also have their locations known). In this way, the ice impact recorder 760's data essentially characterizes the signature of the ice impact events, allowing the events to be mathematically modeled for later analysis and processing.

Returning to the operation (FIG. 28), the system 650 (FIG. 27) concurrently operates the air guns of the source 90 according to a set routine, while the impact recorder 760 records any impact events (Block 708). In operating the source 90, for example, the source elements or guns 91 may be fired every 50-meters as the towing vessel 30 maintains a predetermined course. In response to seismic energy, the sensors 70 on the streamers 60 detect resulting seismic data (Block 710), and the seismic recorder 750 records the seismic data obtained (Block 712).

The firing and recording is repeated throughout the towing operation and can follow customary operations for performing marine seismic surveying known and used in the art. Briefly, the system 650 can generate a data stream 770 as diagrammatically shown in FIG. 32 in which the system 650 can fire the air guns every 25 seconds as represented at 772. Typically, when processing the data, the control system (40) usually only processes data during a listening period 774 (e.g., 18 seconds) following each firing 772. Yet, the seismic recorder (750) typically records all of the data during a survey. Therefore, to account for impact events 776 and especially those occurring outside the conventional listening period 774, the control system (40) can adjust the listening period 774 to account for potential ice impact events 776 lying outside of the usual period 774.

Eventually, after the towing operation has been completed, the control system (40) processes the resulting data, including the seismic data obtained with the streamers 60 and data obtained with the impact recorder 760 (Block 714). FIG. 33 graphically shows a representative amplitude response 780 of recorded seismic data of the marine seismic system 650. A first amplitude response 782 resulting from the air gun source (90) is shown, as well as a second amplitude response 184 resulting from ice impact events. These responses 782/784 are only presented for illustrative purposes and are not intended to represent actual data obtained, which would typically have a much more complex nature not suitable for representation herein. In actuality, the recorded amplitude response 780 will not have the two separate responses 782/184 as representatively shown. Instead, the seismic sensors (70) will record a summed waveform of the two responses. Therefore, the control system (40) deconvolves the two amplitude responses 782/784 so the seismic record can be properly analyzed.

At this point in processing, operators can determine whether to use the ice impact events as a seismic source in the recorded seismic data (Block 716). First, the recorded data for the ice impact events are tied to the seismic record as recorded by the sensors 70. Because the recorded impact data provides the signatures of the ice impact events, the effect of the events as seismic sources in the seismic record can be filtered out of the seismic record to produce data that is substantially related to use of the air gun source only and not related to ice impact events. Moreover, by knowing the signature of the ice impact events, the seismic record can actually be processed using the ice impact events as a passive seismic source, potentially giving the analysis additional information and resolution to characterize the seabed formation.

If enough useful impact events have occurred in a given area of the seismic record, for example, operators may wish to use the events as a high fidelity source for generating seismic data to characterize the formation. If the events are not useful, however, operators may elect to subtract or remove that portion of the seismic data generated due to the ice impact events. Selecting to use or not to use the ice impact events can be done over one or more portions of the seismic record of interest or over the entire record depending on the circumstances.

If multiple ice impact events have occurred of sufficient duration and frequency, for example, the control system (40) can isolate the events in the seismic data and actually use it to create a seismic record with the ice impact events acting as a passive source. In this case, operators may elect to use the ice impact events, and the control system (40) can mathematically model the events as a high fidelity source (Block 218). This is possible because the control system (40) can determine precisely when and where an ice impact event occurred based on the GPS data and timestamp recorded by the impact recorder (760). The spectrum of each individual ice impact event can be modeled and then subsequently used as a source in the seismic data. Only those impacts of a significant amplitude, frequency, and duration may be of interest for use as high fidelity sources of seismic data. Characteristics of the ice impact events will vary based on numerous variables.

As long as the control system (40) knows when and where the impacts occurred along with the impact event's signature (i.e., frequency and duration), then the control system (40) can use the impact event as if was a source for the seismic survey. Then, using the regular seismic data produced by the air gun source 90 and the ice impact events as an additional passive source, the control system (40) can analyze the seismic data to characterize the formation using known processing techniques (Block 720).

If operators elect not to use the ice impact events, the control system (40) is used mathematically model the events (Block 722) and remove the events' data from the seismic record using a noise attenuation routine (Block 724). Then, using the regular seismic data produced by the air gun source 90 with the ice impact events filtered out, the control system (40) can analyze the seismic data to characterize the formation using known processing techniques (Block 720).

The foregoing description of preferred and other embodiments is not intended to limit or restrict the scope or applicability of the inventive concepts conceived of by the Applicants. The teachings of the present disclosure can apply to 2-D, 3-D, and 4-D seismic surveying in icy or obstructed waters, as well under normal marine seismic conditions. Moreover, aspects and techniques discussed in conjunction with one particular embodiment, implementation, or arrangement disclosed herein can be used or combined with aspect and techniques discussed in others disclosed herein. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A marine seismic surveying apparatus for obstructed waters, the apparatus comprising:
    a deployed device disposed at an end of a seismic streamer and towed below a surface of water;
    at least one buoy extending from the end of the seismic streamer to a surface of the water;
    at least one coupling connecting the at least one buoy to the end of the seismic streamer and being breakable due to tension from the at least one buoy obstructed at the surface of the water; and
    at least one receiver associated with the buoy and obtaining location information via the at least one buoy at the surface of the water,
    wherein the deployed device comprises an inertial navigation system reckoning location of the deployed device in the water in place of the location information obtained with the at least one receiver.

2. The apparatus of claim 1, wherein the deployed device produces drag when towed in the water by the seismic streamer.

3. The apparatus of claim 2, wherein the deployed device comprises one or more of a propeller, a fin, a drogue, and a reverse propulsion device producing the drag in the water.

4. The apparatus of claim 2, further comprising a reel coupled to the streamer and being operable to maintain the streamer at tension in the water.

5. The apparatus of claim 2, wherein the deployed device is controllable to vary the produced drag and maintain the streamer at tension in the water.

6. The apparatus of claim 1, wherein the deployed device comprises a variable buoyancy system controlling a depth of the deployed device in the water.

7. The apparatus of claim 1, wherein the deployed device comprises a movable mass controlling an orientation of the deployed device in the water.

8. The apparatus of claim 1, wherein the at least one receiver comprises a global positioning system receiver disposed on the buoy.

9. The apparatus of claim 1, wherein the deployed device comprises at least one detector detecting obstructions at the surface of the water.

10. The apparatus of claim 1, wherein the at least one coupling comprises at least one line extending from the end of the streamer to the at least one buoy.

11. The apparatus of claim 10, wherein the at least one coupling comprises a breakable connection between the at least one line and the deployed device.

12. The apparatus of claim 1, wherein at least a portion of the at least one receiver is disposed on the at least one buoy.

13. The apparatus of claim 12, wherein the at least one coupling communicates the portion of the at least one receiver disposed on the at least one buoy with the streamer.

14. The apparatus of claim 1, wherein the deployed device and the at least one buoy comprise acoustic devices transmitting an acoustic signal in the water therebetween.

15. The apparatus of claim 14, wherein the apparatus locates the deployed device relative to the at least one buoy with the acoustic signal and correlates the relative location of the deployed device to the location information obtained with the at least one buoy.

16. The apparatus of claim 14, wherein the acoustic device on the at least one buoy communicates the location information obtained via the at least one receiver from the at least one buoy to the deployed device using the acoustic signal.

17. The apparatus of claim 1, wherein the apparatus comprises an actuator being controllable to deploy the at least one buoy from an undeployed condition at the deployed device to a deployed condition at the surface of the water.

18. The apparatus of claim 17, wherein the apparatus comprises a plurality of the at least one buoy; and wherein the actuator deploys an undeployed one of the buoys from the deployed device in response to the coupling of a deployed one of the buoys breaking.

19. A marine seismic surveying apparatus for obstructed waters, the apparatus comprising:
    a deployed device disposed at an end of a seismic streamer towed below a surface of water;
    a fixed mast extending from the deployed device and being movable on a rotatable connection;
    a buoy disposed on the fixed mast and buoyant at a surface of the water; and
    a receiver associated with the buoy and obtaining location information via the buoy at the surface of the water.

20. The apparatus of claim 19, wherein the deployed device comprises an inertial navigation system reckoning location of the deployed device in the water in place of the location information obtained with the at least one receiver.

21. A marine seismic surveying apparatus for obstructed waters, the apparatus comprising:
    a deployed device disposed at an end of a seismic streamer towed below a surface of water;
    a reel disposed on the deployed device and being operable to extend or retract a line;
    a buoy disposed on the line and buoyant at a surface of the water; and
    a receiver associated with the buoy and obtaining location information via the buoy at the surface of the water.

22. The apparatus of claim 21, wherein the deployed device comprises an inertial navigation system reckoning location of the deployed device in the water in place of the location information obtained with the at least one receiver.

* * * * *